US010484182B2

(12) United States Patent
Isshiki et al.

(10) Patent No.: US 10,484,182 B2
(45) Date of Patent: Nov. 19, 2019

(54) ENCRYPTED TEXT VERIFICATION SYSTEM, METHOD, AND RECORDING MEDIUM

(71) Applicants: NEC CORPORATION, Tokyo (JP); Satoshi Obana, Koganei-shi, Tokyo (JP)

(72) Inventors: Toshiyuki Isshiki, Tokyo (JP); Kengo Mori, Tokyo (JP); Toshinori Araki, Tokyo (JP); Satoshi Obana, Tokyo (JP)

(73) Assignees: NEC CORPORATION, Minato-ku, Tokyo (JP); Satoshi Obana, Koganei-shi, Tokyo (JP)

( * ) Notice: Subject to any disclaimer, the term of this patent is extended or adjusted under 35 U.S.C. 154(b) by 151 days.

(21) Appl. No.: 15/524,151

(22) PCT Filed: Oct. 26, 2015

(86) PCT No.: PCT/JP2015/005366
§ 371 (c)(1),
(2) Date: May 3, 2017

(87) PCT Pub. No.: WO2016/072057
PCT Pub. Date: May 12, 2016

(65) Prior Publication Data
US 2017/0324563 A1 Nov. 9, 2017

(30) Foreign Application Priority Data
Nov. 5, 2014 (JP) .................................. 2014-225102

(51) Int. Cl.
*G06F 11/30* (2006.01)
*H04L 9/32* (2006.01)
(Continued)

(52) U.S. Cl.
CPC ........ *H04L 9/3247* (2013.01); *G06F 11/1012* (2013.01); *G06F 11/1076* (2013.01);
(Continued)

(58) Field of Classification Search
CPC .. G06F 11/1076; G06F 11/1012; G06F 21/32; G06F 21/45; G06F 2221/2107;
(Continued)

(56) References Cited
U.S. PATENT DOCUMENTS

2008/0178008 A1* 7/2008 Takahashi ............... G06F 21/32
713/186
2008/0247540 A1* 10/2008 Ahn ...................... H04L 9/0877
380/44
(Continued)

FOREIGN PATENT DOCUMENTS

JP 2006-158851 A 6/2006
JP 2008-92413 A 4/2008
(Continued)

OTHER PUBLICATIONS

Multi-Algorithm Fusion with Template Protection, E.J.C. Kelkboom, X. Zhou, J. Breebaart, R.N.J. Veldhuis, C. Busch, IEEE 2009 (Year: 2009).*
(Continued)

*Primary Examiner* — Gary S Gracia
(74) *Attorney, Agent, or Firm* — Sughrue Mion, PLLC

(57) ABSTRACT

In a data registration phase, encrypted data is calculated by encrypting input data to be concealed by using a secret key, registration data is generated based on the encrypted data and a verification key, and the registration data is stored as a registration template in a storage unit together with an identifier for uniquely identifying the registration data. In an encrypted text verification phase, a data verifying request is generated in which input data to be verified has been
(Continued)

encrypted by using a random number, the registration template stored in the storage unit and the data verifying request are verified to produce a determined result, a verified result including a part or all of the registration template corresponding to the determined result is produced, and data is restored based on the verified result to produce a restored result.

17 Claims, 20 Drawing Sheets

(51) Int. Cl.
| | | |
|---|---|---|
| *G09C 1/00* | (2006.01) | |
| *G06F 11/10* | (2006.01) | |
| *H03M 13/15* | (2006.01) | |
| *H04L 9/14* | (2006.01) | |
| *H04L 9/30* | (2006.01) | |
| *G06F 21/32* | (2013.01) | |
| *G06F 21/45* | (2013.01) | |
| *G06F 21/00* | (2013.01) | |

(52) U.S. Cl.
CPC .............. *G06F 21/32* (2013.01); *G06F 21/45* (2013.01); *G09C 1/00* (2013.01); *H03M 13/152* (2013.01); *H04L 9/14* (2013.01); *H04L 9/30* (2013.01); *G06F 2221/2107* (2013.01); *H04L 2209/12* (2013.01); *H04L 2209/72* (2013.01)

(58) Field of Classification Search
CPC ......... H04L 2209/12; H04L 9/14; H04L 9/30; H04L 9/3247; H04L 2209/72
USPC .......................... 380/28, 30; 713/182; 726/2
See application file for complete search history.

(56) References Cited

U.S. PATENT DOCUMENTS

| | | | |
|---|---|---|---|
| 2013/0262863 A1 | 10/2013 | Yoshino et al. | |
| 2014/0331044 A1* | 11/2014 | Fujii | H04L 9/3239 |
| | | | 713/165 |
| 2015/0195090 A1* | 7/2015 | Obana | H04L 9/3231 |
| | | | 380/30 |
| 2015/0236850 A1* | 8/2015 | Furukawa | H04L 9/0822 |
| | | | 380/281 |
| 2015/0281188 A1* | 10/2015 | Sakemi | H04L 63/0428 |
| | | | 713/171 |
| 2015/0334100 A1* | 11/2015 | Isshiki | H04L 9/065 |
| | | | 726/6 |

FOREIGN PATENT DOCUMENTS

| | | |
|---|---|---|
| JP | 2012123614 A | 6/2012 |
| WO | 2013/080365 A1 | 6/2013 |
| WO | 2014/010725 A1 | 1/2014 |
| WO | 2014/092183 A1 | 6/2014 |

OTHER PUBLICATIONS

Pim Tuyls, et al., "Practical Biometric Authentication with Template Protection", Proceedings of AVBPA 2005, Lecture Notes in Computer Science, Springer Verlag, 2005, pp. 436-446, vol. 3546.

International Search Report of PCT/JP2015/005366, dated Jan. 19, 2016. [PCT/ISA/210].

Written Opinion of PCT/JP2015/005366, dated Jan. 19, 2016. [PCT/ISA/237].

Notice of Reasons for Refusal dated Jun. 26, 2019 from the Japanese Patent Office in application No. 2016-557449.

Izu, Tetsuya, et al., "Yet Another Vulnerability in a Cancelable Biometrics Authentication Scheme", 2014 The Symposium on Cryptography and Information Security, SCIS2014, Jan. 21, 2014, 3E4-a, pp. 2-12/E (11 pages).

* cited by examiner

ENCRYPTED TEXT VERIFICATION SYSTEM, METHOD, AND RECORDING MEDIUM

CROSS REFERENCE TO RELATED APPLICATIONS

This application is a National Stage of International Application No. PCT/JP2015/005366 filed Oct. 26, 2015, claiming priority based on Japanese Patent Application No. 2014-225102, filed Nov. 5, 2014, the contents of all of which are incorporated herein by reference in their entirety.

TECHNICAL FIELD

This invention relates to an encrypted text verification system, a method therefor, and a recording medium therefor, which permit ambiguity in encrypted data. In particular, this invention relates to an encrypted text verification system, a method therefor, and a recording medium therefor for a case in which a Hamming distance of plaintext is used for an index of ambiguity when input data to be concealed (verifying source data) as well as input data to be verified (data to be verified) are both encrypted.

BACKGROUND ART

In recent years, with the wide-spreading of cloud, there has been a rapid expansion of services based on user's data stored in computational resources connected to networks. In such services, there are more opportunities for handling sensitive data of the user. Therefore, it is becoming important to assure users that the user's data is being securely managed.

Under such circumstances, research and development are being actively promoted for techniques to manage data in an open network environment while the data is still encrypted and to perform searching, statistical processing, and so on without decrypting the data.

There has also recently been an increase in crime exploiting vulnerabilities in personal authentication that uses passwords or magnetic cards, which has heretofore been employed. Therefore, biometric authentication technology having a greater degree of security based on a biometric feature, such as fingerprints or veins, is drawing attention.

In biometric authentication, in order to verify authentication information, it is necessary to store a template related to biometric information in a database. The biometric information, for example, information on fingerprints or veins, is data that basically does not change over a person's lifetime. When the biometric information is leaked, serious damage may occur as a result. Therefore, biometric information is information requiring the highest level of confidentiality. Thus, it is necessary to prevent "impersonation", for example, even when the template is leaked.

In view of this, there is a need for a type of biometric authentication technology that protects the template, in which the authentication is performed while keeping the template information concealed.

For example, in Patent Document 1, there is disclosed a method in which biometric authentication is performed using, as a template, data obtained by representing fingerprint data as points on a polynomial expression and adding random points to the points to conceal the fingerprint data.

However, in the method disclosed in Patent Document 1, it is known that there is a problem regarding whether or not the biometric information is protected with sufficient strength when biometric authentication is repeated many times.

In Non Patent Document 1, there is disclosed a method in which biometric information is protected by masking a template stored in a database through a random Bose-Chaudhuri-Hocquenghem (BCH) code word.

In the technology disclosed in Non Patent Document 1, a biometric authentication template is generated in the following manner by using biometric information Z and confidential information S.

(A1) The confidential information S is subjected to BCH error-correction coding to generate a code word C.

(A2) An exclusive OR between the code word C and the biometric information Z, namely, $W1=C(+)Z$, is calculated (where the symbol (+) is an operator indicating a bitwise exclusive OR).

(A3) A hash value $W2=H(S)$ is calculated by inputting the confidential information S to a cryptographic hash function H, for example, a secure hash algorithm (SHA) 1.

(A4) The exclusive OR W1 and the hash value W2 are stored in a database as template information.

Verification of whether or not the template generated as described in (A1) to (A4) and other biometric information Z' have been obtained from the same person may be performed as follows.

(B1) An exclusive OR C' between the exclusive OR W1 and the other biometric information Z', namely, $C'=W1(+)Z'$, is calculated.

(B2) The exclusive OR C' is input to an error-correcting algorithm with a BCH code to calculate S'.

(B3) The hash value W2 is read from the database, and it is checked whether or not $W2=H(S')$ is satisfied. When $W2=H(S')$ is satisfied, it is determined that the template and the biometric information Z' have been obtained from the same person. When $W2=H(S')$ is not satisfied, it is determined that the template and the biometric information Z' have been obtained from different persons.

The technology described above is a method that does not depend on how the biometric information Z is obtained. Therefore, in general, that technology may be regarded as a method of performing matching of whether or not the encrypted text of concealed (encrypted) data is within a fixed Hamming distance to the presented data, without decrypting the concealed (encrypted) data.

As a verifying method for data that is still encrypted, there are known methods that use searchable encryption in which deterministic symmetric key encryption or public key encryption is used. However, in general, those methods require the keyword to be used in the search to be unique. When verifying is performed as described above by using biometric information, it is known that the obtained biometric information is not always the same due to noise that is included when the biometric information is acquired. Therefore, there are difficulties in applying searchable encryption to a method in which biometric information is verified.

In Patent Document 2, there is disclosed an encrypted text verification system capable of, in encrypted text verifying, avoiding leaks regarding source plaintext and guaranteeing data security. The encrypted text verification system disclosed in Patent Document 2 includes a registration auxiliary data generation unit, an encrypted text subtraction unit, and a match determination unit. The registration auxiliary data generation unit is configured to generate first auxiliary data and second auxiliary data for verifying, for a first encrypted text in which input data to be concealed is encrypted and registered in a storage device and a second encrypted text in which input data to be verified is encrypted, that a Hamming distance of plaintext between the first encrypted text and the second encrypted text is a predetermined value or less set in advance. The encrypted text subtraction unit is configured to calculate a difference between the first encrypted text registered in the storage device and the second encrypted text. The match determination unit is configured to determine, by using the first and second auxiliary data, whether or not the Hamming distance corresponding to the difference between the first encrypted text and the second encrypted text is a predetermined value or less set in advance.

PRIOR ART DOCUMENTS

Patent Document

Patent Document 1: JP 2006-158851 A
Patent Document 2: WO2014/010725A1

Non Patent Document

Non Patent Document 1: Pim Tuyls, Anton H. M. Akkermans, Tom A. M. Kevenaar, Geert-Jan Schrijen, Asker M. Bazen and Raymond N. J. Veldhuis, "Practical Biometric Authentication with Template Protection". Proceedings of AVBPA 2005, Lecture Notes in Computer Science, Vol. 3546, Springer Verlag, pp. 436-446, (2005)

SUMMARY OF THE INVENTION

Problem to be Solved by the Invention

In the above-mentioned technology, there is a problem in that, when performing verifying of encrypted text in a database while permitting a small degree of error between the verifying source data and the data to be verified, information relating to the verifying source data may be leaked to an administrator of the database, for example. The reasons for this are as follows.

For example, in Patent Document 1, this is because the concealment strength of the encrypted text is insufficient.

In Non Patent Document 1, this is because, in order to enable verifying, it is necessary to transmit the plaintext information during verifying.

In Patent Document 2, this is because an accepted second encrypted text (i.e., verified data) can be generated even without knowing input data to be verified that is close to the registered input data to be concealed (in actual practice, a first encrypted text in which the input data to be concealed is encrypted is registered in a storage device). The reason for this is because in Patent Document 2 each element of the registration data is linear, and hence the second encrypted text (verified data) that is accepted can be generated even when the input data to be verified is not known.

This invention has been made in view of the above-mentioned circumstances, and it is an object of this invention to provide an encrypted text verification system, a method therefor, and a recording medium therefor, which are capable of guaranteeing that verified data cannot be created unless input data to be verified that is close to verifying source data (input data to be concealed) is used, even when verifying is performed a plurality of times.

Means for Solving Problems

An encrypted text verification system according to a first aspect of the present invention comprises: an encryption unit configured to calculate encrypted data by encrypting input data to be concealed by using a secret key; a registration data generation unit configured to generate registration data based on the encrypted data and a verification key; a storage device configured to store the registration data as a registration template in a storage unit together with an identifier for uniquely identifying the registration data; a data verifying request generation unit configured to generate a data verifying request in which input data to be verified has been encrypted by using a random number; a data verifying determination unit configured to verify the registration template stored in the storage unit and the data verifying request to produce a determined result; a verified result generation unit configured to produce a verified result including a part or all of the registration template corresponding to the determined result: and a data restoration unit configured to restore data based on the verified result to produce a restored result.

An encrypted text verification system according to a second aspect of the present invention comprises: an encryption unit configured to calculate encrypted data by encrypting input data to be concealed by using a signature key: a registration data generation unit configured to generate registration data based on the encrypted data and a verification key; a storage device configured to store the registration data as a registration template in a storage unit together with an identifier for uniquely identifying the registration data; a first data verifying request generation unit configured to generate a first data verifying request in which input data to be verified has been encrypted by using a random number; a first data verifying determination unit configured to verify the registration template stored in the storage unit and the first data verifying request to produce a determined result: a first verified result generation unit configured to generate, as a first verified result, a combination of a message that has been randomly selected and a part or all of the registration template corresponding to the determined result; a decryption unit configured to decrypt the first verified result to produce a decrypted result; a second data verifying request generation unit configured to generate a second data verifying request based on the decrypted result and the message included in the first verified result; a second data verifying determination unit configured to generate a second data verifying determination based on the second data verifying request and the registration data of the registration template recorded in the storage unit; and a second verified result generation unit configured to generate, as a second verified result, an identifier of the registration data corresponding to the second data verifying determination.

An encrypted text verification system according to a third aspect of the present invention comprises: an encryption unit configured to calculate encrypted data by encrypting input data to be concealed by using a secret key: a registration data generation unit configured to generate registration data based on the encrypted data and a public key: a storage device configured to store the registration data as a registration template in a storage unit together with an identifier for uniquely identifying the registration data: a first data verifying request generation unit configured to generate a first data verifying request in which input data to be verified has been encrypted by using a random number; a first data verifying determination unit configured to verify the registration template stored in the storage unit and the first data verifying request to produce a determined result; a first verified result generation unit configured to generate, as a first verified result, a combination of a message that has been randomly selected and a part or all of the registration template corresponding to the determined result; a decryption unit configured to decrypt the first verified result to produce a decrypted result; a second data verifying request generation unit configured to generate a second data verifying request based on the decrypted result and the message included in the first verified result: a second data verifying determination unit configured to generate a second data verifying determination based on the second data verifying request and the registration data of the registration template recorded in the storage unit: and a second verified result generation unit configured to generate, as a second verified result, an identifier of the registration data corresponding to the second data verifying determination.

Effect of the Invention

According to this invention, even when verifying processing is performed a plurality of times or even when the database owner who is performing the verifying processing has malicious intent, generation of the input data to be verified that is transmitted by the user during verifying without knowing the verifying source data (input data to be concealed) can be prevented.

Figure 1:
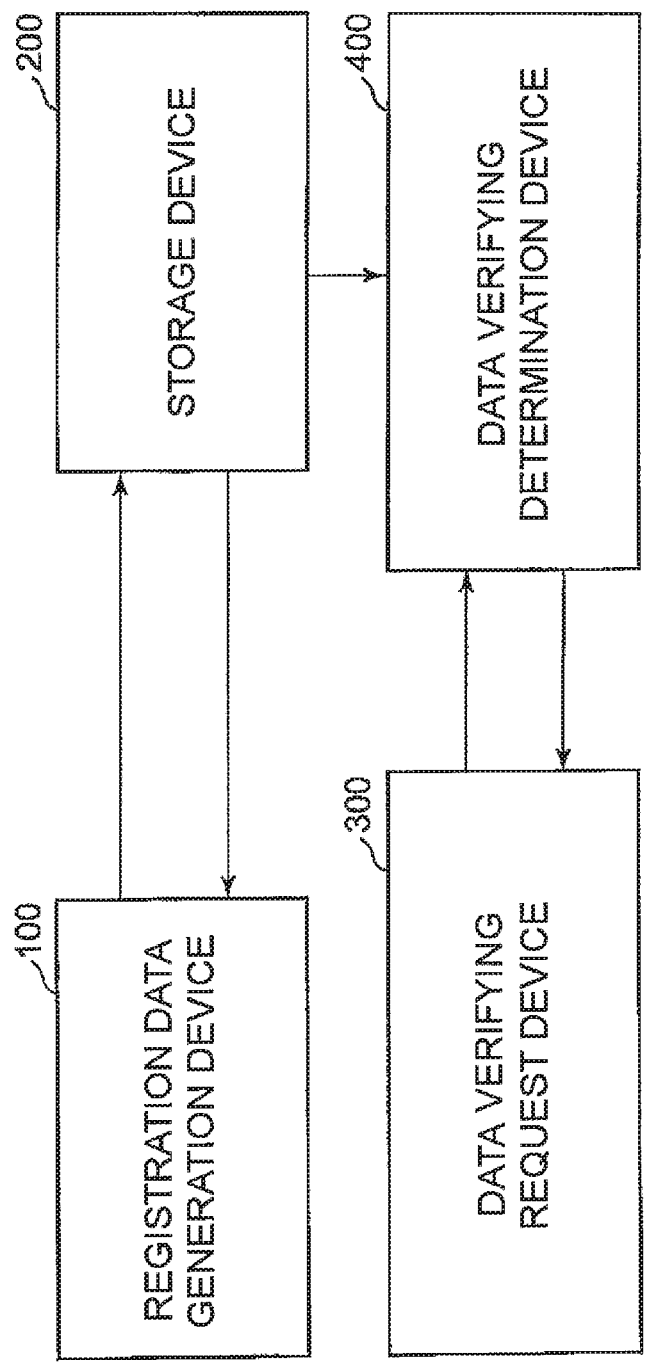
FIG. 1 is a block diagram for illustrating a configuration example of an encrypted text verification system according to a first example embodiment of this invention.

MODES FOR EMBODYING THE INVENTION (Description of Outline of Invention)

An encrypted text verification system according to this invention is configured to generate a data verifying request by encrypting input data to be verified that is transmitted by a user for verifying based on data in which a random number has been subjected to error-correction coding. Not only the encrypted data stored in the database but also the input data to be verified that is transmitted by the user for matching is encrypted by a cryptosystem having a high concealment strength. Through changing of the random number to be used for encryption each time verifying is performed, it is impossible to generate the input data to be verified that is transmitted by the user for verifying without knowing the verifying source data (input data to be concealed).

The outline of this invention is now briefly described in order to facilitate understanding of this invention.

In this invention, acceptance or non-acceptance is determined based on a degree of similarity, and not based on perfect matching. In this invention, input data z to be concealed and input data z' to be verified are used to perform the determination. In this invention, while the input data z to be concealed and the input data z' to be verified are kept concealed, whether or not the input data z to be concealed and the input data z' to be verified are close can be confirmed, and it can be guaranteed that verified data that is accepted cannot be created unless input data z' to be verified that is close to the input data z to be concealed is used. In other words, a novel point of this invention is the fact that the nature of the input data z' to be verified can be mathematically guaranteed.

In this invention, an error-correcting code and a digital signature (or an encryption protocol, for example, public-key encryption) are used.

In the case of a digital signature, z(+)ENC(sk), which is calculated from an exclusive OR between the input data z to be concealed and ENC(sk) in which a secret key sk of the signature has been subjected to error-correcting coding, and a verification key vk are generated as registration data. The z(+)ENC(sk) is hereinafter referred to as Expression (1).

In the case of public-key encryption, a public key pk is used in place of the verification key vk, and a decryption key dk is used in place of the secret key sk.

The verifying is divided into two phases.

(Verifying phase 1) A client transmits to a server an exclusive OR z'(+)ENC(R) between the input data z' to be verified and an ENC(R) in which a random number R has been subjected to error-correction coding. The server performs error-correction decoding on (1) (+)(z'(+)ENC(R)). At this stage, when the input data z to be concealed and the input data z' to be verified are close values, decryption can be performed, and the decryption result is sk(+)R The server transmits that value together with a random message M to the client. When decryption is not possible, the processing is stopped.

(Verifying phase 2) The client obtains the secret key sk of the signature by calculating a decrypted result sk(+)R(+)R by using the random number R used in the verifying phase 1. The client then generates a digital signature a by using the secret key sk of the signature and the message M, and transmits the generated digital signature σ to the server. The server verifies the signature by using the verification key vk, and determines acceptance or non-acceptance.

Intuitively, this invention uses the fact that only a person who knows a value close to the input data z to be concealed can extract the secret key sk of the signature from Expression (1), and only a person who knows the secret key sk of the signature can generate a verification key vk that is accepted. Therefore, the method of this invention can guarantee that verified data that is accepted cannot be created unless input data z' to be verified that is close to the input data z to be concealed is used.

This invention can also be applied as an invention even at the point of the above-mentioned verifying phase 1. The reason for this is that in the above-mentioned example, the secret key sk is extracted in the verifying phase 1, and authorization is performed based on the signature in the verifying phase 2, but in the verifying phase 2, the secret key sk received in the verifying phase 1 can be used for encrypted communication and an encryption protocol in addition to authorization. In other words, in this case, a secret key that has simply been encrypted and stored is extracted.

In this way, in this invention, there is a degree of freedom in that a secret key is obtained in two phases other than for the verified result, and in how that secret key is used.

(First Example Embodiment)

Next, an encrypted text verification system according to a first example embodiment of this invention is described in detail with reference to the drawings.

Referring to FIG. 1, the encrypted text verification system according to the first example embodiment of this invention includes a registration data generation device 100, a storage device 200, a data verifying request device 300, and a data verifying determination device 400.

An entity that uses the registration data generation device 100 and the data verifying request device 300 is a client. An entity that has the storage device 200 and that uses the data verifying determination device 400 is a server. In other words, the registration data generation device 100 is implemented as a first client, and the data verifying request device 300 is implemented as a second client. A combination of the storage device 200 and the data verifying determination device 400 operates as a server. The first client and the second client may be separate clients or may be the same single client.

[Description of Configuration]

Figure 2:
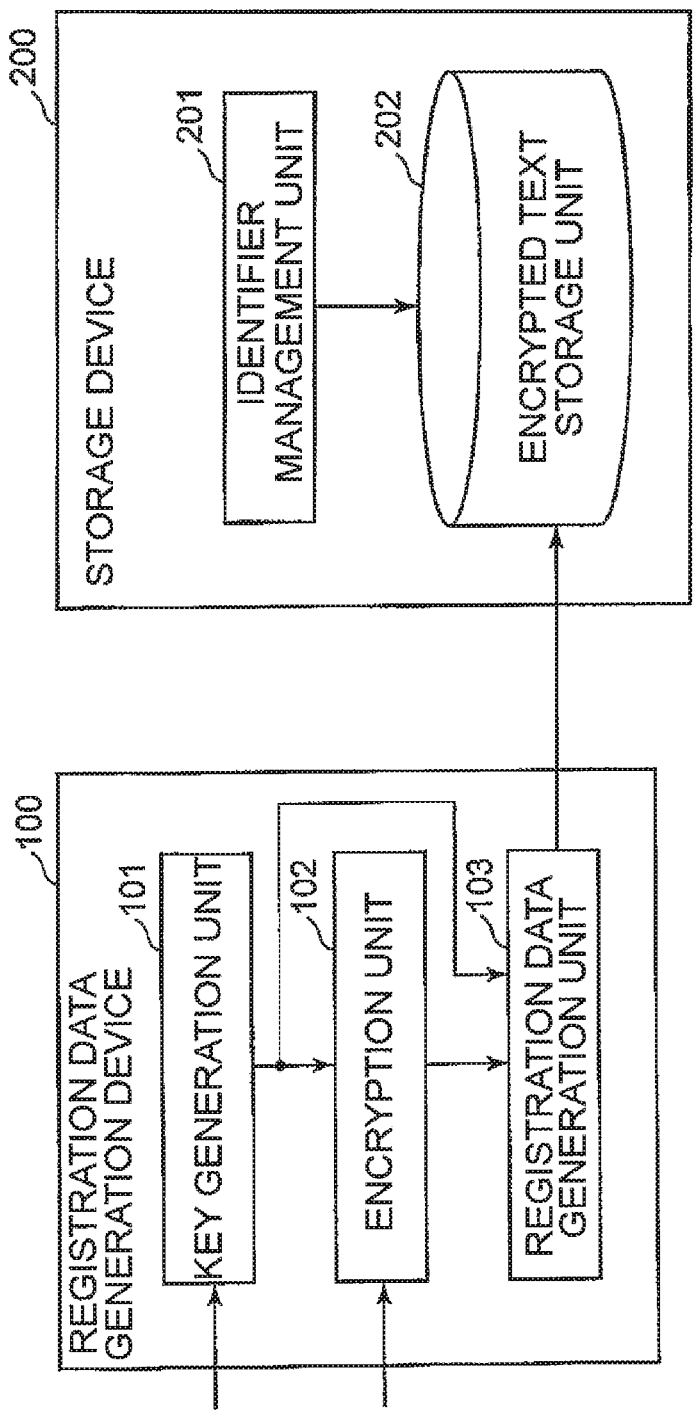
FIG. 2 is a block diagram for illustrating a configuration example of a registration data generation device and a storage device that are used in the encrypted text verification system illustrated in FIG. 1.

Referring to FIG. 2, the registration data generation device 100 includes a key generation unit 101, an encryption unit 102, and a registration data generation unit 103.

The key generation unit 101 is configured to receive a security parameter as input, and to produce a verification key and a secret key. The encryption unit 102 is configured to receive the secret key, the verification key, and input data to be concealed as input, and to produce an encrypted text (i.e., encrypted data). The registration data generation unit 103 is configured to receive the verification key and the encrypted text (i.e., encrypted data) as input, and to produce registration data, which is data for determining that a Hamming distance between the input data to be verified corresponding to encrypted data produced by a data verifying request generation unit 301 (described later) of the data verifying request device 300 and the input data to be concealed input to the encryption unit 102 is within a fixed number. The registration data includes the encrypted data.

Regarding the encrypted text produced by the encryption unit 102 of the registration data generation device 100, when a first encrypted text in which first input data m1 has been encrypted by a first key k1 is c1, and a second encrypted text in which second input data m2 has been encrypted by a second key k2 is c2, the sum (c1+c2) of the first encrypted text c1 and the second encrypted text c2 is an encrypted text in which the input data (m1+m2) has been encrypted by a key (k1+k2).

As illustrated in FIG. 2, the storage device 200 includes an identifier management unit 201 and an encrypted text storage unit 202. The storage device 200 is configured to store the registration data produced by the registration data generation device 100, and to store an identifier corresponding to the registration data during verifying of the encrypted data.

The identifier management unit 201 is configured to manage an identifier for uniquely identifying the registration data input from the registration data generation device 100. The encrypted text storage unit 202 is configured to store a registration template including the identifier issued by the identifier management unit 201 and the registration data received from the registration data generation device 100.

Figure 3:
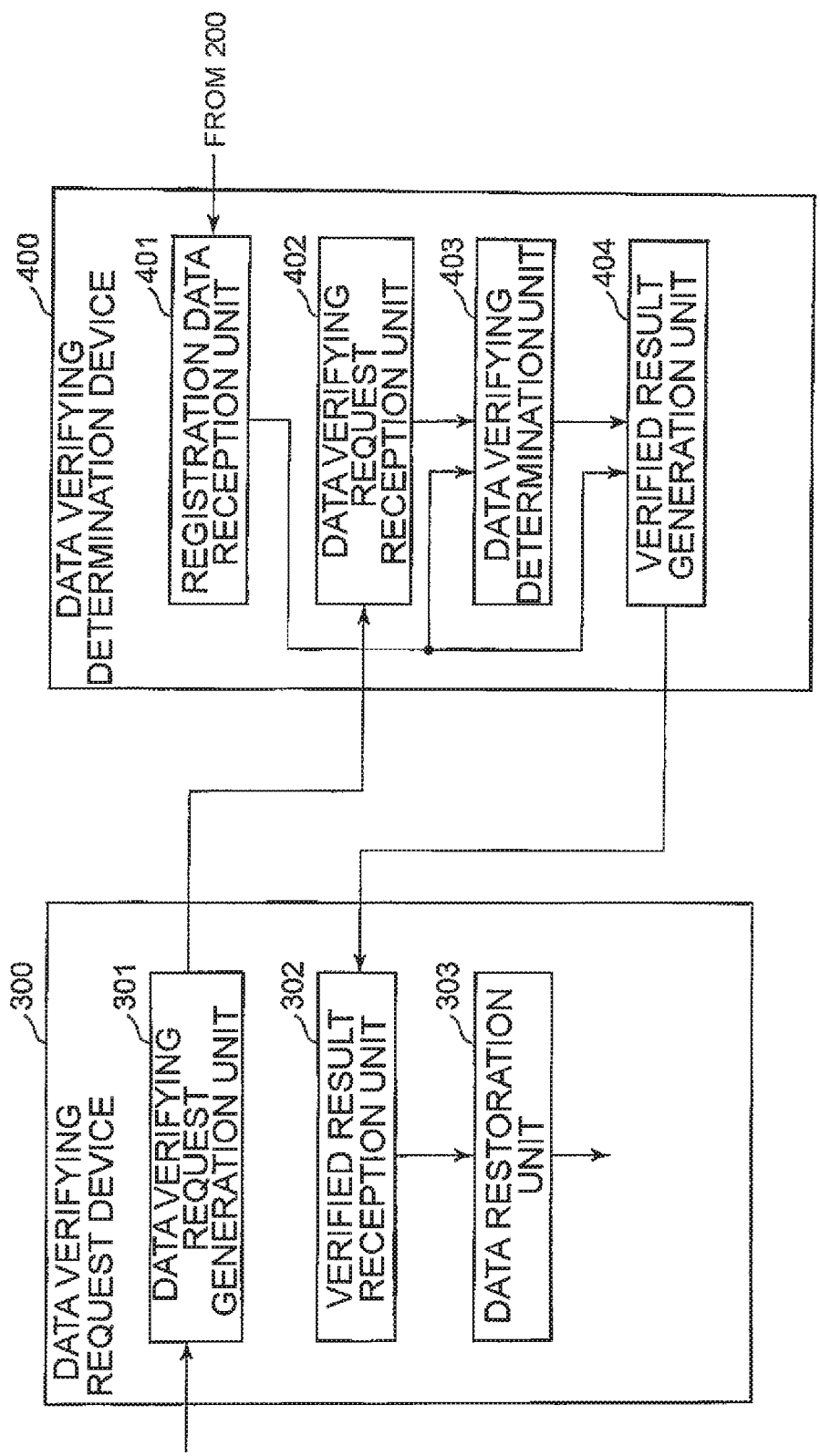
FIG. 3 is a block diagram for illustrating a configuration example of a data verifying request device and a data verifying determination device that are used in the encrypted text verification system illustrated in FIG. 1.

Referring to FIG. 3, the data verifying request device 300 includes the data verifying request generation unit 301, a verified result reception unit 302, and a data restoration unit 303.

The data verifying request generation unit 301 is configured to receive input data to be verified as input, and to produce a data verifying request, which is obtained by subjecting the input data to be verified to concealment processing. The verified result reception unit 302 is configured to receive a verified result generated by the data verifying determination device 400 in response to the data verifying request. The data restoration unit 303 is configured to generate restored data based on the received verified result as input.

As illustrated in FIG. 3, the data verifying determination device 400 includes a registration data reception unit 401, a data verifying request reception unit 402, a data verifying determination unit 403, and a verified result generation unit 404.

The registration data reception unit 401 is configured to receive the registration template stored in the storage device 200. The data verifying request reception unit 402 is configured to receive the data verifying request from the data verifying request device 300. The data verifying determination unit 403 is configured to perform, based on the registration template and the data verifying request as input, verifying between the verifying data concealed as the data verifying request and the registration data concealed as the encrypted data to produce a determined result. The verified result generation unit 404 is configured to produce, based on the determined result and the registration template as input, a verified result including a part or all of the registration template corresponding to the determined result. The verified result includes at least the registration template corresponding to the determined result, or includes a symbol or a message indicating that the registration template corresponding to the determined result does not exist.

[Description of Operation]

Next, operation of this invention is described in detail.

Operation of the encrypted text verification system according to the first example embodiment of this invention is broadly divided into two phases, namely, a data registration phase and an encrypted text verification phase.

The data registration phase is a phase in which the input data to be concealed is input to the registration data generation device 100, the input data to be concealed is encrypted, and the encrypted data is registered in the storage device 200. The encrypted text verification phase is a phase in which the input data to be verified that has been input to the data verifying request device 300 is encrypted, and a determination is performed by the data verifying determination device 400 regarding whether or not the data verifying request generated at that time is plaintext close to (i.e., having a small Hamming distance to) the registration data in the storage device 200.

The operation performed in each phase is now described in detail.

Figure 4:
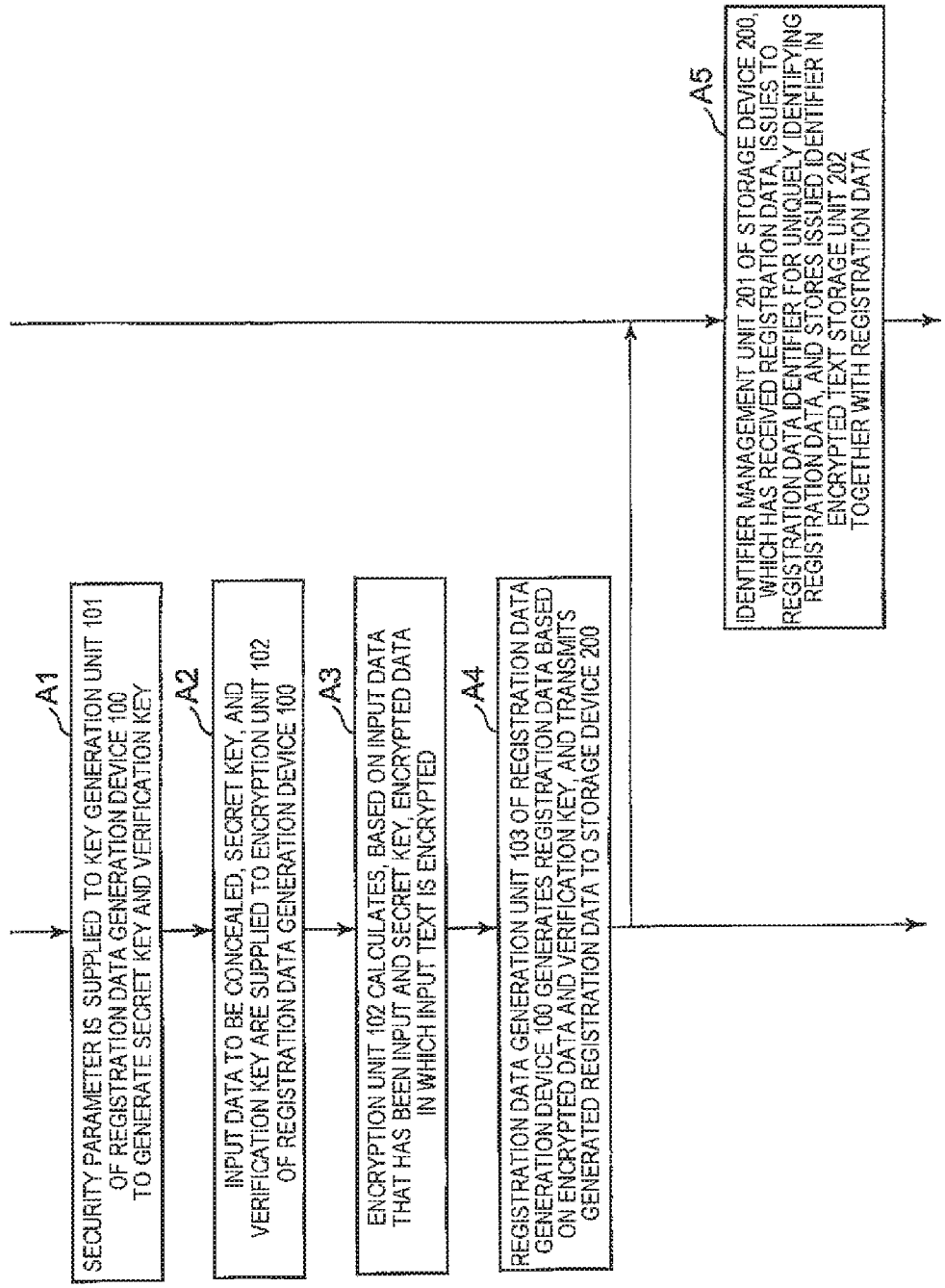
FIG. 4 is a flowchart for illustrating an operation example of a data registration phase of the encrypted text verification system illustrated in FIG. 1.

Referring to FIG. 4, in the data registration phase, first, a security parameter is supplied to the key generation unit 101 of the registration data generation device 100, and a secret key and a verification key are generated (Step A1). Next, the input data to be concealed, the secret key, and the verification key are supplied to the encryption unit 102 of the registration data generation device 100 (Step A2).

Next, the encryption unit 102 calculates, based on the input data that has been input and the secret key, encrypted data in which the input data is encrypted (Step A3). Next, the registration data generation unit 103 of the registration data generation device 100 generates the registration data based on the encrypted data and the verification key, and transmits the generated registration data to the storage device 200 (Step A4).

Next, the identifier management unit 201 of the storage device 200, which has received the registration data, issues to the registration data an identifier for uniquely identifying the registration data, and stores the issued identifier together with the registration data as the registration template in the encrypted text storage unit 202 (Step A5).

Figure 5:
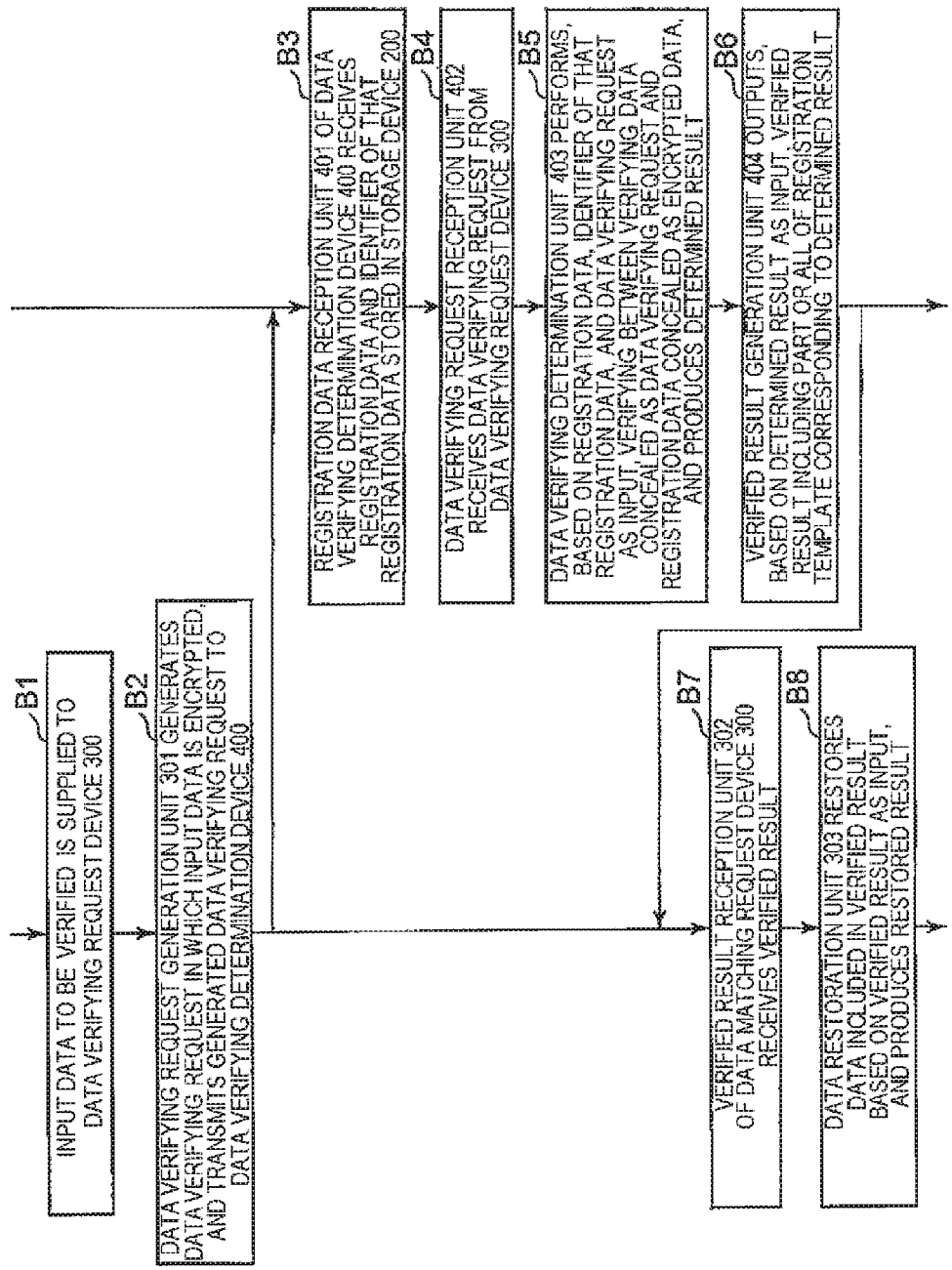
FIG. 5 is a flowchart for illustrating an operation example of an encrypted text verification phase of the encrypted text verification system illustrated in FIG. 1.

Referring to FIG. 5, in the encrypted text verification phase, first, the input data to be verified is supplied to the data matching request device 300 (Step B1). Next, the data verifying request generation unit 301 generates a data verifying request in which the input data is encrypted, and transmits the generated data verifying request to the data verifying determination device 400 (Step B2).

Next, the registration data reception unit 401 of the data verifying determination device 400 receives the registration data and the identifier of that registration data, which are stored in the storage device 200 (Step B3). Next, the data verifying request reception unit 402 receives the data verifying request from the data verifying request device 300 (Step B4).

Next, the data verifying determination unit 403 performs, based on the registration data, the identifier of that registration data, and the data verifying request as input, verifying between the verifying data concealed as the data verifying request and the registration data concealed as the encrypted data, and produces a determined result (Step B5). Next, the verified result generation unit 404 produces, based on the determined result as input, a verified result including a part or all of the registration template corresponding to the determined result (Step B6). The verified result includes at least the registration template corresponding to the determined result, or includes a symbol or a message indicating that the registration template corresponding to the determined result does not exist.

Next, the verified result reception unit 302 of the data verifying request device 300 receives the verified result (Step B7). When the verified result is a symbol or a message indicating that the registration template corresponding to the determined result does not exist, processing is stopped due to there being no verification. In other cases, the processing proceeds to the next step.

Next, the data restoration unit 303 restores the data included in the verified result based on the verified result as input, and produces a restored result (Step B8).

In this way, in the first example embodiment, it can be guaranteed that a data verifying request that is accepted cannot be created unless input data to be verified that is close to the input data to be concealed is used. The reason for this is that only a person who knows the input data to be concealed can extract the secret key, and only a person who knows the secret key can generate a verification key that is accepted. As a result, even when verification processing is performed a plurality of times, or even when the database owner who is performing the verification processing has malicious intent, generation of the input data to be verified that is transmitted by the user during verifying without knowing the verifying source data (input data to be concealed) can be prevented.

The registration data generation device 100, the storage device 200, the data verifying request device 300, and the data verifying determination device 400 of FIG. 1 may be implemented in one computer system, or each device may be configured as a standalone device. Each of the units in the registration data generation device 100, the storage device 200, the data verifying request device 300, and the data verifying determination device 400 may also be configured as a standalone device. The processing performed by each of the units of the devices illustrated in FIG. 1 may also be implemented by a program executed by a computer.

(Second Example Embodiment)

Next, a second example embodiment of this invention is described in detail with reference to the drawings.

A difference between the encrypted text verification system described in the first example embodiment of this invention and an encrypted text verification system described in the second example embodiment of the invention is the entity receiving the verified result corresponding to the data verifying request. Specifically, with the encrypted text verification system described in the first example embodiment of this invention, only the entity that issued the data verifying request can obtain the result of that data verifying request. However, with the encrypted text verification system described in the second example embodiment of this invention, depending on the data verifying request, the entity performing the verification processing may also obtain the result of the data verifying request.

Figure 6:
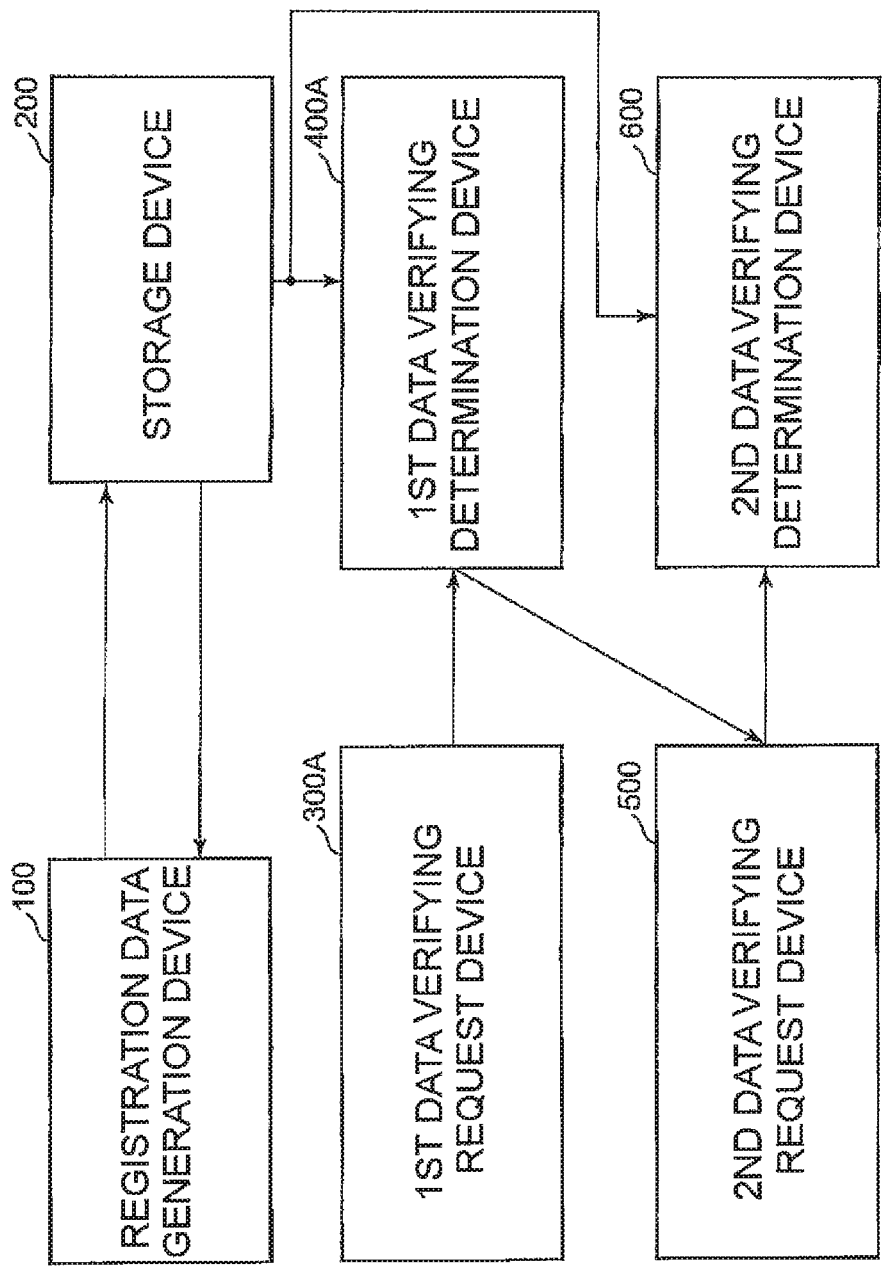
FIG. 6 is a block diagram for illustrating a configuration example of an encrypted text verification system according to a second example embodiment of this invention.

Referring to FIG. 6, the encrypted text verification system according to the second example embodiment of this invention comprises the registration data generation device 100, the storage device 200, a first data verifying request device 300A, a first data verifying determination device 400A, a second data verifying request device 500, and a second data verifying determination device 600.

An entity that uses the registration data generation device 100, the first data verifying request device 300A, and the second data verifying request device 500 is a client. An entity that has the storage device 200 and that uses the first data verifying determination device 400A and the second data verifying determination device 600 is a server. In other words, the registration data generation device 100 is implemented as a first client, and a combination of the first data verifying request device 300A and the second data verifying request device 500 is implemented as a second client. A combination of the storage device 200, the first data verifying determination device 400A, and the second data verifying determination device 600 operates as a server. The first client and the second client may be separate clients or may be the same single client.

[Description of Configuration]

Figure 7:
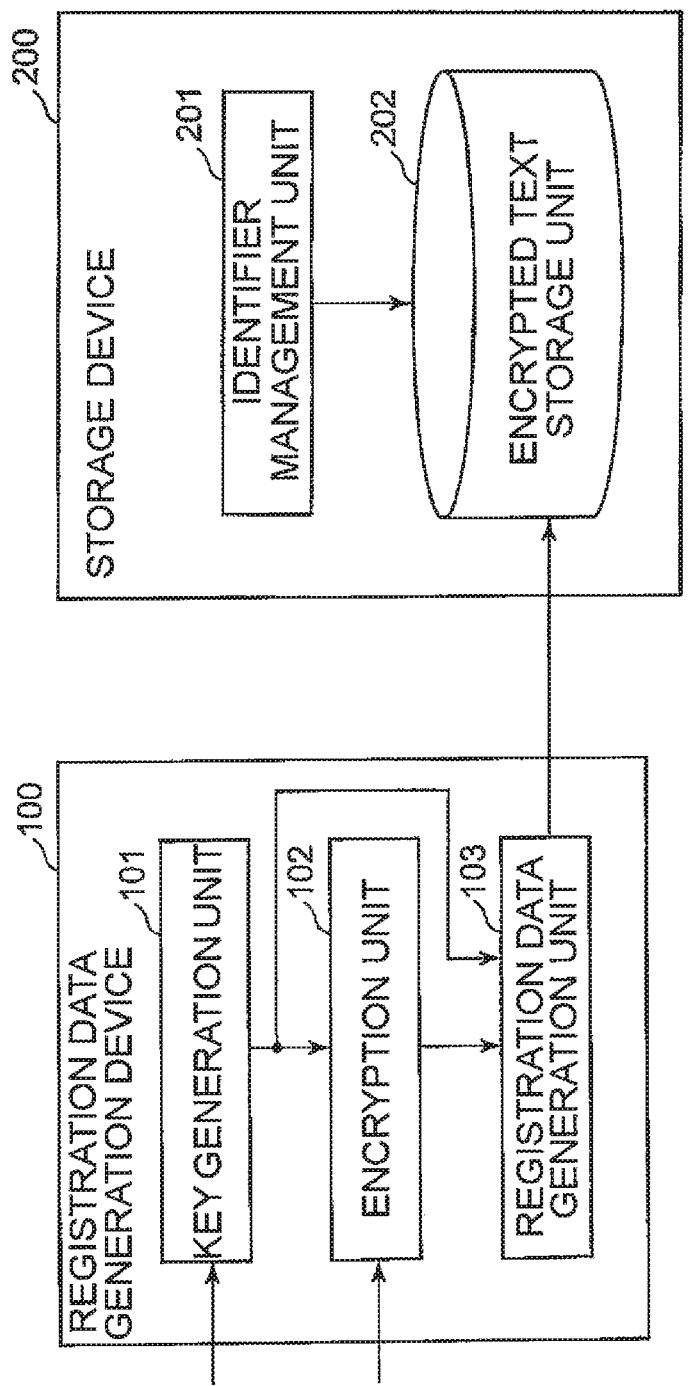
FIG. 7 is a block diagram for illustrating a configuration example of a registration data generation device and a storage device that are used in the encrypted text verification system illustrated in FIG. 6.

Referring to FIG. 7, the registration data generation device 100 comprises the key generation unit 101, the encryption unit 102, and the registration data generation unit 103.

The key generation unit 101 is configured to receive a security parameter as input, and to produce a signature verification key and a signature key. The encryption unit 102 is configured to receive the signature key, the verification key, and input data to be concealed as input, and to produce an encrypted text (i.e., encrypted data). The registration data generation unit 103 is configured to receive the signature verification key and the encrypted text as input, and to produce registration data, which is data for determining that a Hamming distance between the input data to be verified corresponding to the encrypted data produced by a first data verifying request generation unit 301A (described later) of the first data verifying request device 300A and the input data to be concealed input to the encryption unit 102 is within a fixed number.

Regarding the encrypted text produced by the encryption unit 102 of the registration data generation device 100, when the first encrypted text in which the first input data m1 has been encrypted by the first key k1 is c1, and the second encrypted text in which the second input data m2 has been encrypted by the second key k2 is c2, the sum c1+c2 of the first encrypted text c1 and the second encrypted text c2 is an encrypted text in which the input data (m1+m2) has been encrypted by the key (k1+k2).

As illustrated in FIG. 7, the storage device 200 includes the identifier management unit 201 and the encrypted text storage unit 202. The storage device 200 is configured to store the registration data output by the registration data generation device 100, and to store an identifier corresponding to the registration data during verifying of the encrypted data.

The identifier management unit 201 is configured to manage an identifier for uniquely identifying the registration data supplied from the registration data generation device 100. The encrypted text storage unit 202 is configured to store a registration template including the identifier issued by the identifier management unit 201 and the registration data received from the registration data generation device 100.

Figure 8:
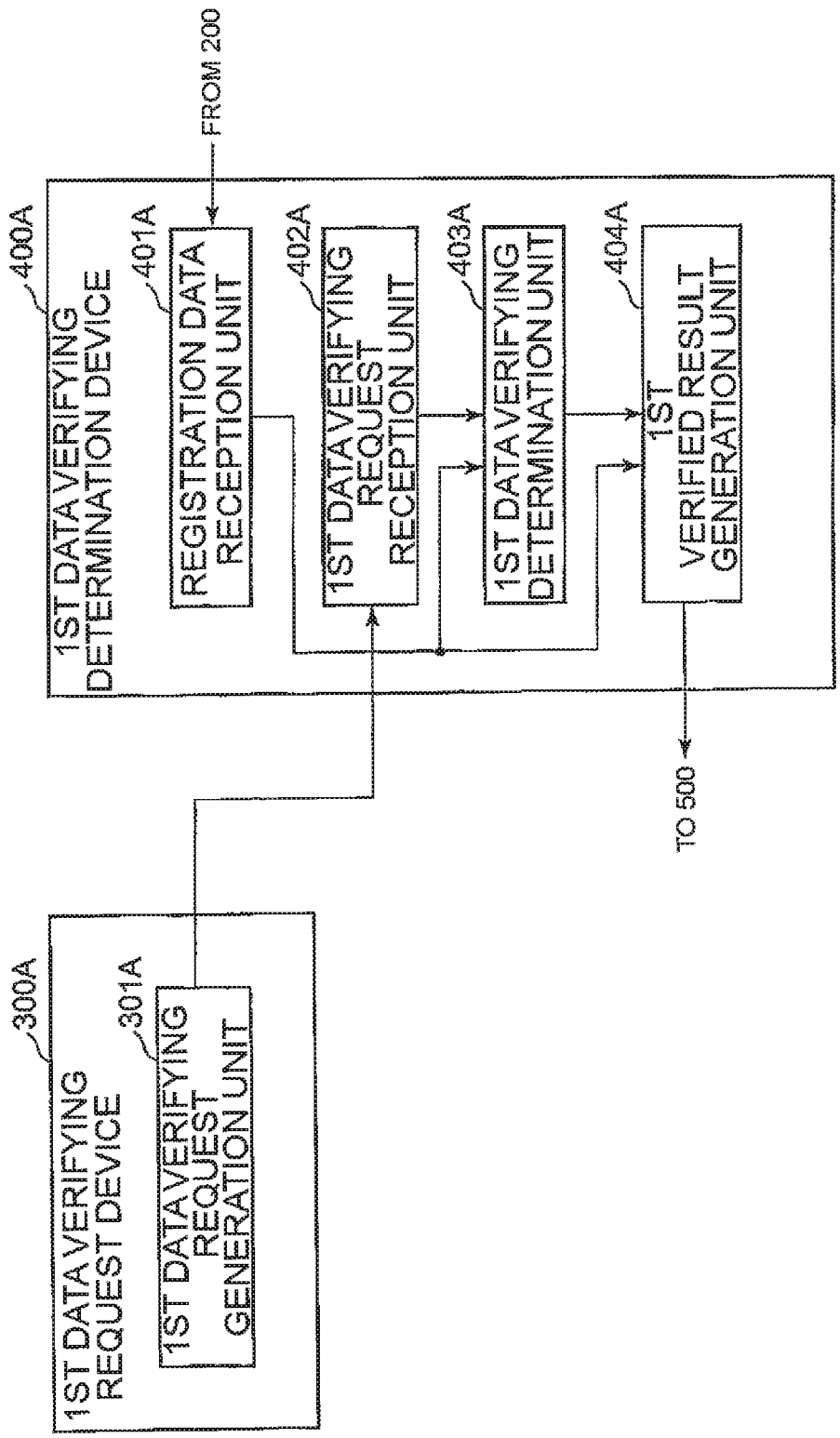
FIG. 8 is a block diagram for illustrating a configuration example of a first data verifying request device and a first data verifying determination device that are used in the encrypted text verification system illustrated in FIG. 6.

Referring to FIG. 8, the first data verifying request device 300A comprises the first data verifying request generation unit 301A.

The first data verifying request generation unit 301A is configured to receive input data to be verified as input, and to produce a first data verifying request, which is obtained by subjecting the input data to be verified to concealment processing.

As illustrated in FIG. 8, the first data verifying determination device 400A comprises a registration data reception unit 401A, a first data verifying request reception unit 402A, a first data verifying determination unit 403A, and a first verified result generation unit 404A.

The registration data reception unit 401A is configured to receive the registration template stored in the storage device 200. The first data verifying request reception unit 402A is configured to receive the first data verifying request from the first data verifying request device 300A. The first data verifying determination unit 403A is configured to perform, based on the registration template and the first data verifying request as input, verifying between the verifying data concealed as the first data verifying request and the registration data concealed as the encrypted data to produce a determined result.

The first verified result generation unit 404A is configured to produce, based on the determined result and the registration template as input, a first verified result including the message M for uniquely identifying the verified result and a part or all of the registration template corresponding to the determined result. The first verified result includes at least the registration template corresponding to the determined result, or includes a symbol or a message indicating that the registration template corresponding to the determined result does not exist.

Figure 9:
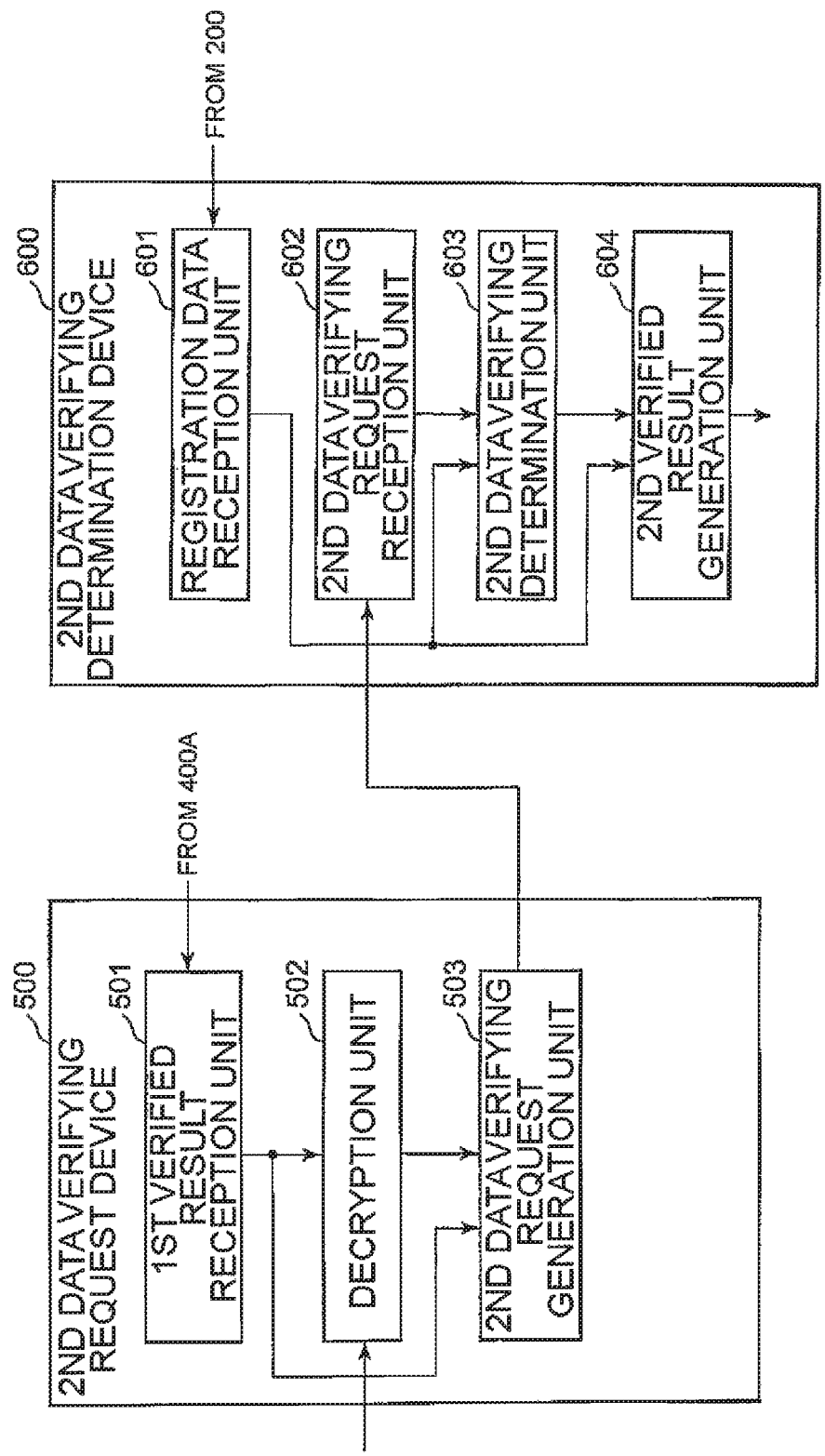
FIG. 9 is a block diagram for illustrating a configuration example of a second data verifying request device and a second data verifying determination device that are used in the encrypted text verification system illustrated in FIG. 6.

Referring to FIG. 9, the second data verifying request device 500 comprises a first verified result reception unit 501, a decryption unit 502, and a second data verifying request generation unit 503.

The first verified result reception unit 501 is configured to receive the message M and the first verified result from the first data verifying determination device 400A. The decryption unit 502 is configured to receive the first verified result and the input data to be verified as input, to decrypt the encrypted data included in the first verified result to produce a decrypted result. The second data verifying request generation unit 503 is configured to receive the decrypted result and the message M included in the first verified result as input, and to generate a second data verifying request.

As illustrated in FIG. 9, the second data verifying determination device 600 comprises a registration data reception unit 601, a second data verifying request reception unit 602, a second data verifying determination unit 603, and a second verified result generation unit 604.

The registration data reception unit 601 is configured to receive the registration template stored in the storage device 200. The second data verifying request reception unit 602 is configured to receive the second data verifying request from the second data verifying request device 500. The second data verifying determination unit 603 is configured to receive the registration template and the second data verifying request as input to generate a second data verifying determination. The second verified result generation unit 604 is configured to receive the second data verifying determination and the registration template as input to produce a second verified result.

[Description of Operation]

Next, operation of the encrypted text verification system according to the second example embodiment of this invention is described in detail.

Operation of the encrypted text verification system according to the second example embodiment of this invention is broadly divided into two phases, namely, a data registration phase and an encrypted text verification phase. The data registration phase is a phase in which the input data to be concealed is supplied to the registration data generation device 100, the input data to be concealed is encrypted, and the encrypted data is registered in the storage device 200. The encrypted text verification phase is a phase in which the input data to be verified that has been supplied to the first data verifying request device 300A and the second data verifying request device 500 is encrypted, and a determination is performed by the first data verifying determination device 400A and the second data verifying determination device 600 regarding whether or not the first data verifying request and the second data verifying request generated at that time are plaintext close to (i.e., having a small Hamming distance to) the registration data in the storage device 200. The operation performed in each phase is now described in more detail.

Figure 10:
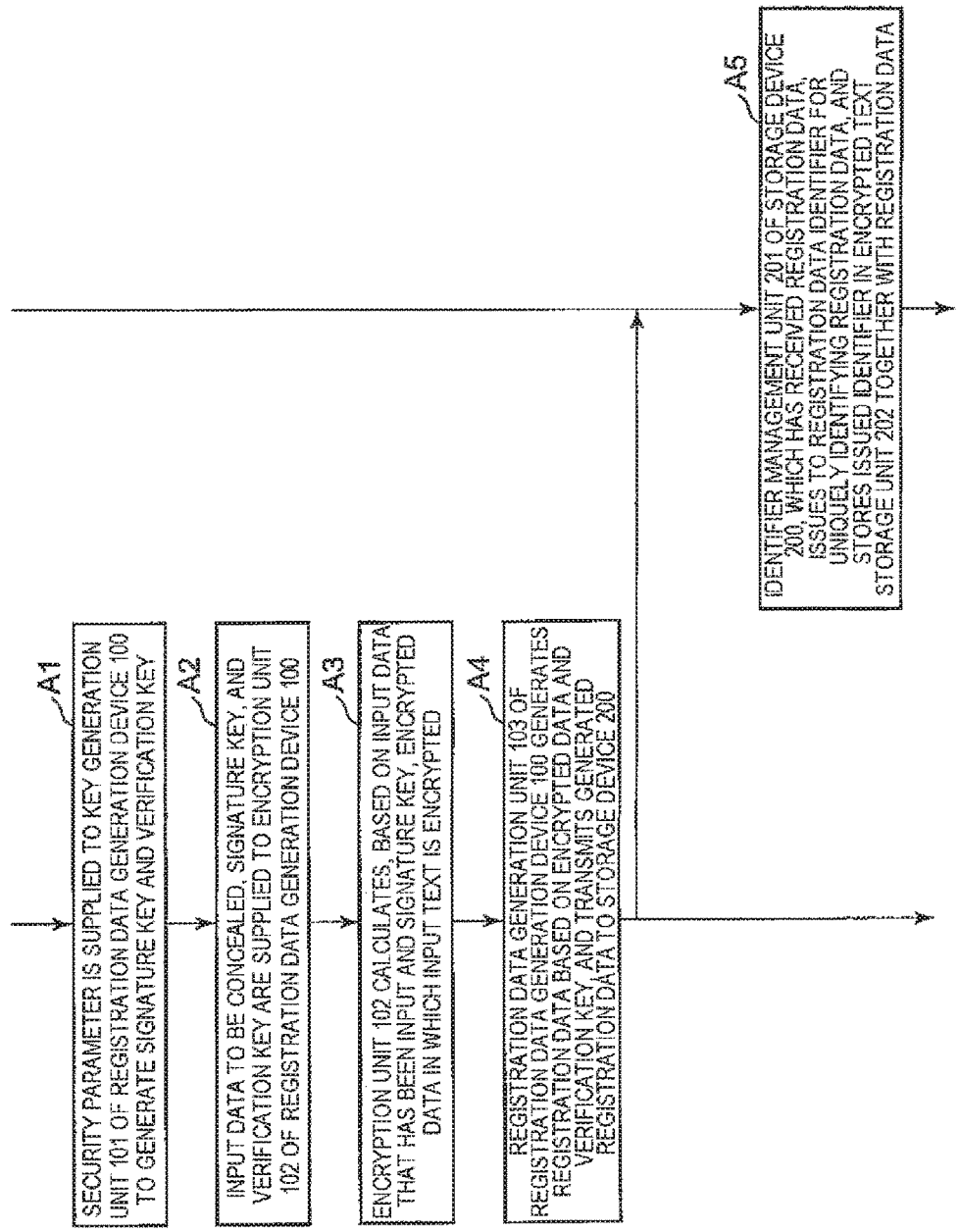
FIG. 10 is a flowchart for illustrating an operation example of a data registration phase of the encrypted text matching system illustrated in FIG. 7.

As illustrated in FIG. 10, in the data registration phase, first, a security parameter is supplied to the key generation unit 101 of the registration data generation device 100, and a signature key and a verification key are generated (Step A1). Next, the input data to be concealed, the signature key, and the verification key are supplied to the encryption unit 102 of the registration data generation device 100 (Step A2).

Next, the encryption unit 102 calculates, based on the input data that has been input and the signature key, encrypted data in which the input data is encrypted (Step A3). Next, the registration data generation unit 103 of the registration data generation device 100 generates the registration data based on the encrypted data and the verification key, and transmits the generated registration data to the storage device 200 (Step A4).

Next, the identifier management unit 201 of the storage device 200, which has received the registration data, issues to the registration data an identifier for uniquely identifying the registration data, and stores the issued identifier together with the registration data in the encrypted text storage unit 202 (Step A5).

Figure 11:
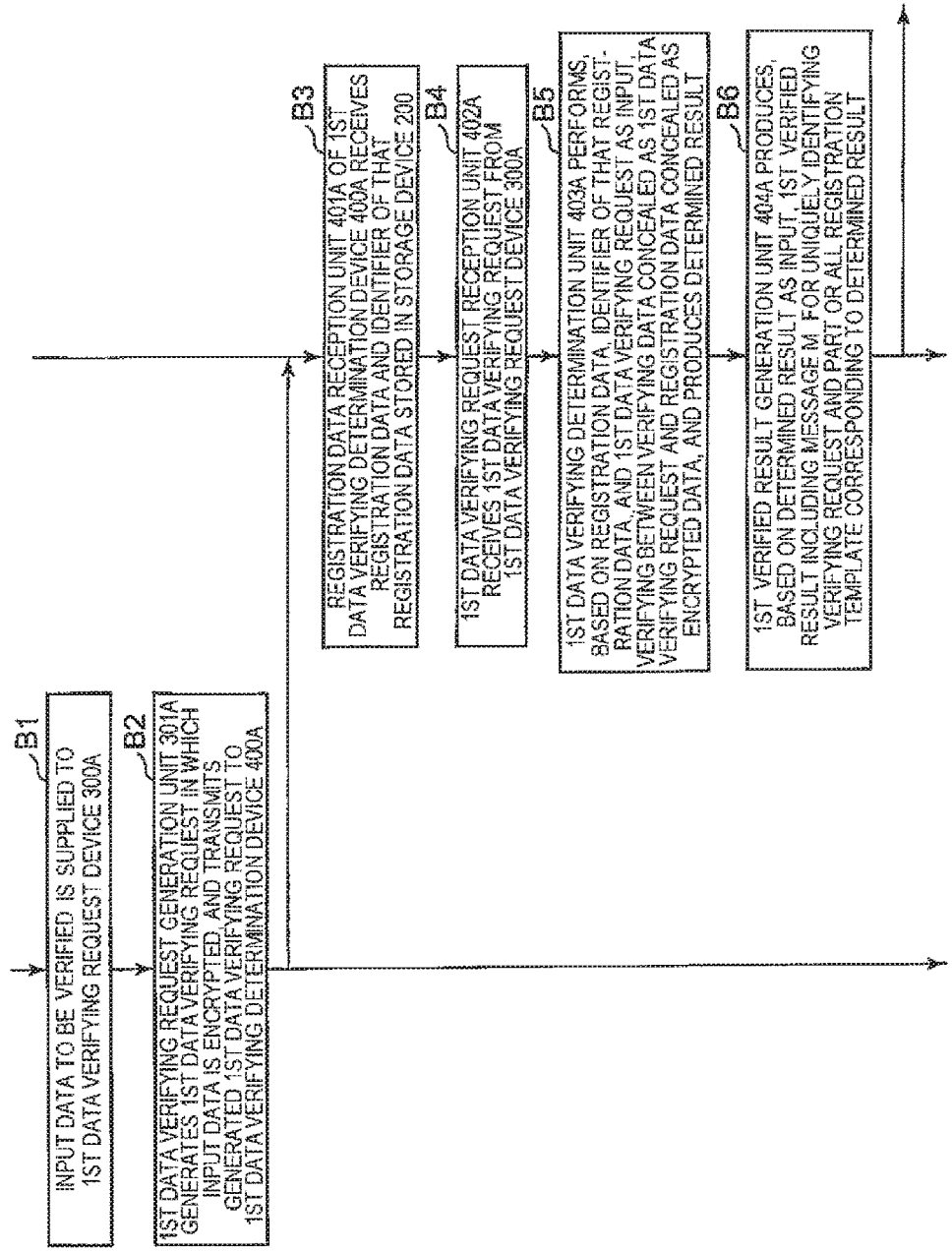
FIG. 11 is a flowchart for illustrating an operation example of a first half of an encrypted text verification phase of the encrypted text verification system illustrated in FIG. 6.

Referring to FIG. 11, in the encrypted text verification phase, first, the input data to be verified is supplied to the first data verifying request device 300A (Step B1). Next, the first data verifying request generation unit 301A generates a first data verifying request in which the input data is encrypted, and transmits the generated first data verifying request to the first data verifying determination device 400A (Step B2).

Next, the registration data reception unit 401A of the first data verifying determination device 400A receives the registration data and the identifier of that registration data, which are stored in the storage device 200 (Step B3). Next, the first data verifying request reception unit 402A receives the first data verifying request from the first data verifying request device 300A (Step B4).

Next, the first data verifying determination unit 403A performs, based on the registration data, the identifier of that registration data, and the first data verifying request as input, verifying between the verifying data concealed as the first data verifying request and the registration data concealed as the encrypted data, and produces a determined result (Step B5). Next, the first verified result generation unit 404A produces, based on the determined result as input, a first verified result including the message M for uniquely identifying the verifying request and a part or all of the registration template corresponding to the determined result (Step B6). The first verified result includes at least the registration template corresponding to the determined result, or includes a symbol or a message indicating that the registration template corresponding to the determined result does not exist.

Figure 12:
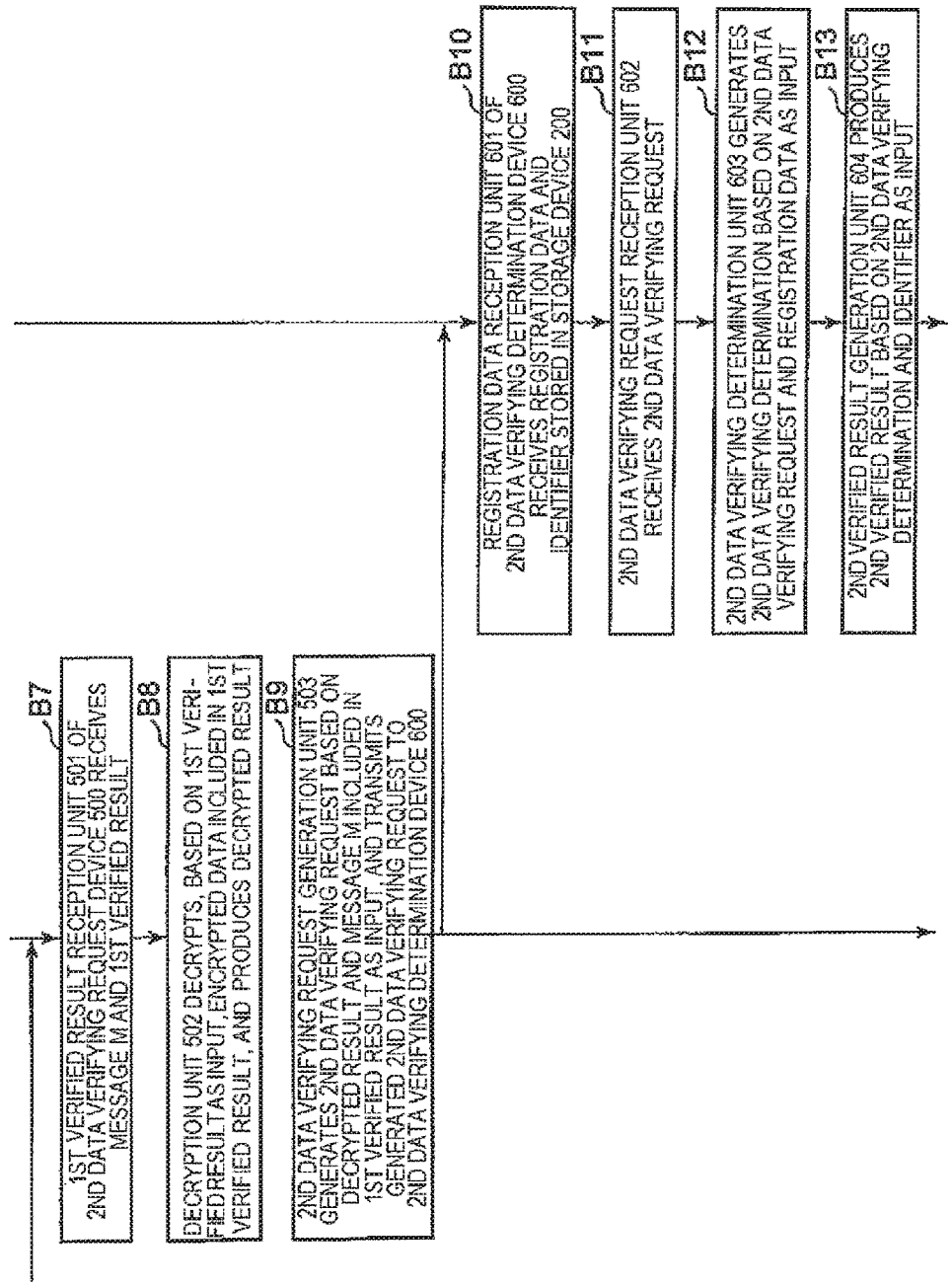
FIG. 12 is a flowchart for illustrating an operation example of a second half of the encrypted text verification phase of the encrypted text verification system illustrated in FIG. 6.

Referring to FIG. 12, the first verified result reception unit 501 of the second data verifying request device 500 receives the message M and the first verified result (Step B7). When the first verified result is a symbol or a message indicating that the registration template corresponding to the determined result does not exist, processing is stopped due to there being no verification. In other cases, the processing proceeds to the next step. Next, the decryption unit 502 decrypts the encrypted data included in the first verified result based on the first verified result as input, and produces a decrypted result (Step B8).

Next, the second data verifying request generation unit 503 generates the second data verifying request based on the decrypted result and the message M included in the first verified result as input, and transmits the generated second data verifying request to the second data verifying determination device 600 (Step B9).

Next, the registration data reception unit 601 of the second data verifying determination device 600 receives the registration data and the identifier stored in the storage device 200 (Step B10). Next, the second data matching request reception unit 602 receives the second data verifying request (Step B11). Next, the second data verifying determination unit 603 generates a second data verifying determination based on the second data verifying request and the registration data as input (Step B12). Next, the second verified result generation unit 604 produces a second verified result based on the second data verifying determination and the identifier as input (Step B13).

In this way, in the second example embodiment, it can be guaranteed that a data verifying request that is accepted cannot be created unless input data to be verified that is close to the input data to be concealed is used. The reason for this is that only a person who knows the input data to be concealed can extract the signature key, and only a person who knows the signature key can generate a verification key that is accepted. As a result, even when verification processing is performed a plurality of times, or even when the database owner who is performing the verification processing has malicious intent, generation of the input data to be verified that is transmitted by the user during verifying without knowing the verifying source data (input data to be concealed) can be prevented.

The registration data generation device 100, the storage device 200, the first data verifying request device 300A, the first data verifying determination device 400A, the second data verifying request device 500, and the second data verifying determination device 600 of FIG. 6 may be implemented in one computer system, or each device may be configured as a standalone device. Each of the units in the registration data generation device 100, the storage device 200, the first data verifying request device 300A, the first data verifying determination device 400A, the second data verifying request device 500, and the second data verifying determination device 600 may also be configured as a standalone device. The processing performed by each of the units of the devices illustrated in FIG. 6 may also be implemented by a program executed by a computer.

EXAMPLE 1

Next, a first example of this invention is described in detail. The first example is an example of the first example embodiment of this invention.

Operation of the encrypted text verification system according to the first example of this invention is broadly divided into two phases, namely, a data registration phase and an encrypted text verification phase.

Figure 13:
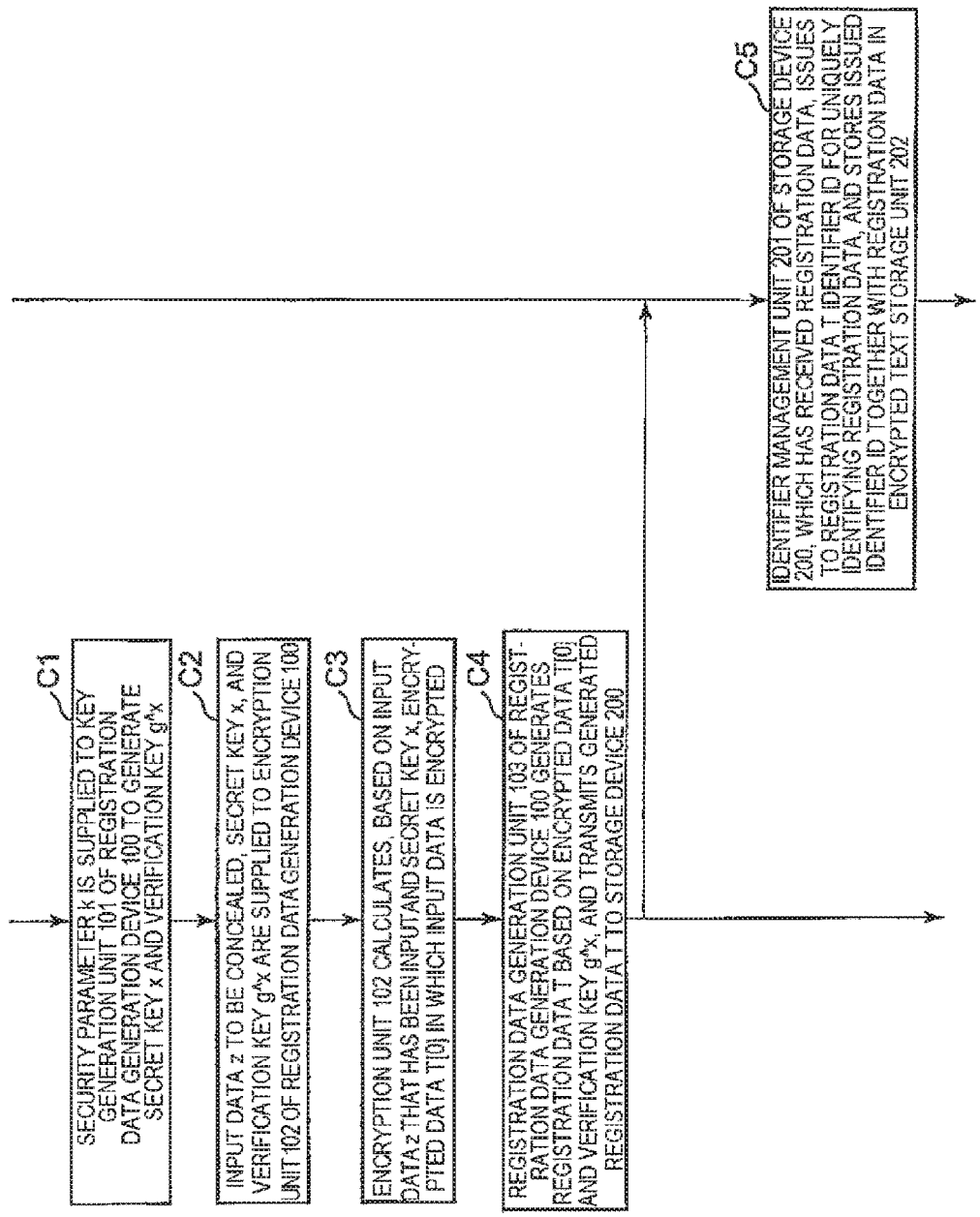
FIG. 13 is a flowchart for illustrating an operation example of a data registration phase of an encrypted text verification system according to a first example of this invention.

Referring to FIG. 13, in the data registration phase, first, a security parameter k is supplied to the key generation unit 101 of the registration data generation device 100 to generate a secret key x and a verification key g^x (Step C1). The security parameter k is a parameter for determining the length of the secret key. The symbol g^x means g to the power of x.

In the first example, g^x is used for the verification key, but H(x) may be used by utilizing a hash function H. Another function may also be used for the verification key, as long as that function enables the uniqueness of the secret key x to be confirmed.

Next, the input data z to be concealed, the secret key x, and the verification key g^x are supplied to the encryption unit 102 of the registration data generation device 100 (Step C2). In the first example, the input data z to be concealed is data of N bits.

Next, the encryption unit 102 generates ENC(x) by performing BCH error-correction coding on the secret key x based on the input data z and the secret key x that have been input. Next, the encryption unit 102 generates encrypted data T[0]=z(+)ENC(x) (Step C3). In the first example, the encryption unit 102 generates a code ENC(x) of the secret key x, but the encryption unit 102 may instead generate a code of a seed for generating the secret key x. From a security perspective, it is desired that the seed be about 80 bits.

Next, the registration data generation unit 103 of the registration data generation device 100 generates registration data T=(T[0], T[1]=g^x) based on the encrypted data T[0] and the verification key g^x, and transmits the generated registration data T=(T[0], T[1]=g^x) to the storage device 200 (Step C4).

Next, the identifier management unit 201 of the storage device 200, which has received the registration data, issues to the registration data T an identifier ID for uniquely identifying the registration data, and stores the issued identifier ID together with the registration data in the encrypted text storage unit 202 (Step C5).

Figure 14:
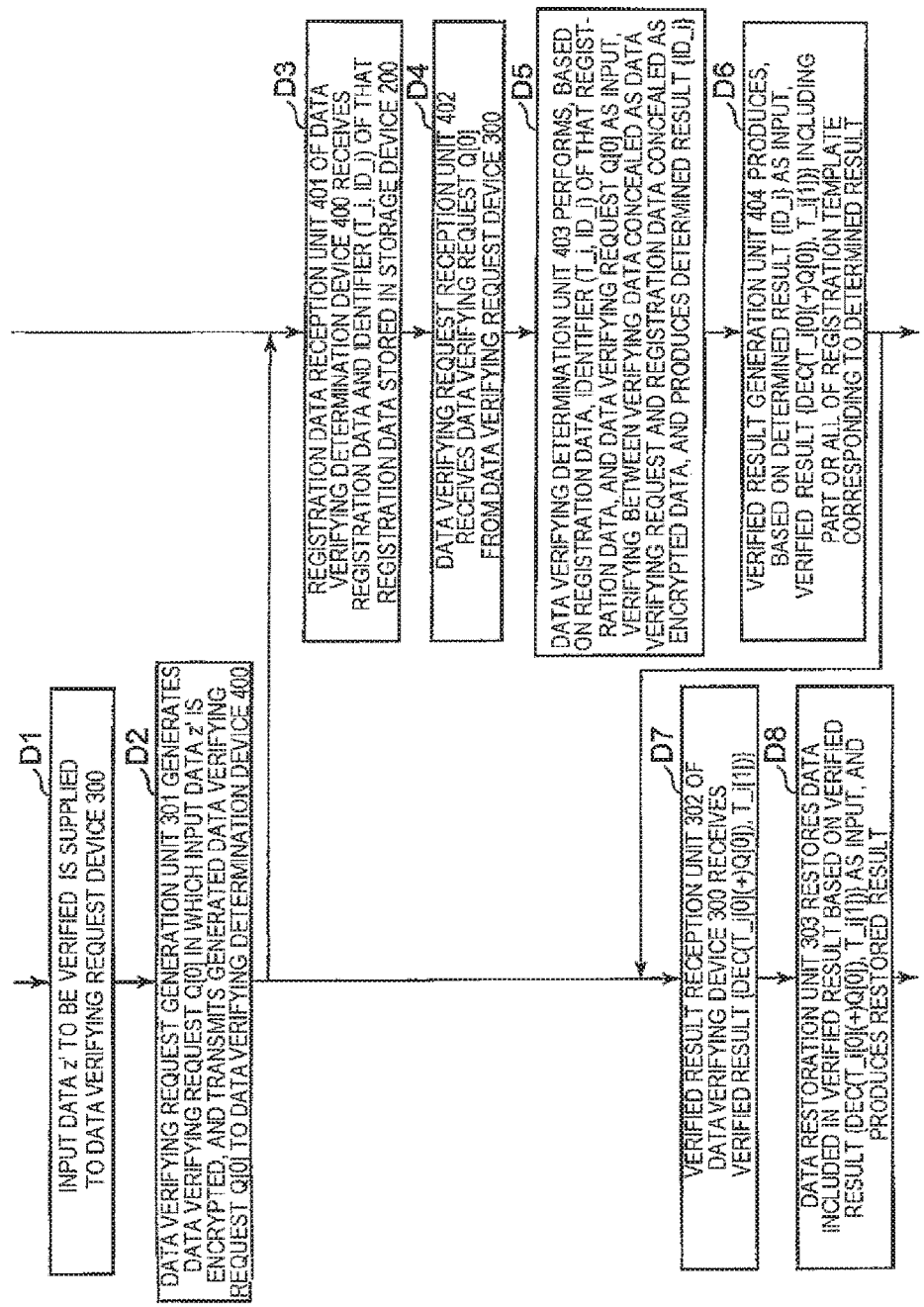
FIG. 14 is a flowchart for illustrating an operation example of an encrypted text verification phase of the encrypted text verification system according to the first example of this invention.

Referring to FIG. 14, in the encrypted text verification phase, first, input data z' to be verified is input to the data verifying request device 300 (Step D1).

Next, the data verifying request generation unit 301 generates BCH encoded data ENC(R) of a random number R based on the input data z' as input. The data verifying request generation unit 301 generates a data verifying request Q[0]=z'(+)ENC(R), and transmits the generated data verifying request to the data verifying determination device 400 (Step D2).

Next, the registration data reception unit 401 of the data verifying determination device 400 receives the registration data and the identifier {(T_1, ID_1), (T_2, ID_2) ..., (T_m, ID_m)} of that registration data, which are stored in the storage device 200 (Step D3). In the first example, T_i=(T_i[0], T_i[1]) is the registration data (i.e., registration template) generated by the registration data generation device 100. In order to describe this point, in the first example, m pieces of registration data are stored in the storage device 200, and those m pieces of registration data are each denoted as (T_i, ID_i) (where i is from 1 to m).

Next, the data verifying request reception unit 402 receives a data verifying request Q[O] from the data verifying request device 300 (Step D4).

Next, the data verifying determination unit 403 calculates $$DEC(T\_i[0](+)Q[0]) \quad \text{(Expression 1)}$$

for i=1, ..., m, based on the registration data, the identifier {(T_1, ID_1), (T_2, ID_2) ..., (T_m, ID_m)} of that registration data, and the data verifying request Q[0] as input. In the first example, DEC(x) means BCH decoding of x. When the input data z to be concealed input when generating the registration data T_i and the input data z' to be verified input when generating the data verifying request Q[0] are close values (in terms of their Hamming distance), the result of Expression 1 becomes x(+)R. When the input data z to be concealed and the input data z' to be verified are not close values, a symbol indicating that decryption is impossible is output. The data verifying determination unit 403 produces, as the determined result, a set {ID_i} of the identifiers ID_i corresponding to the registration data T_i[0] for which the result is that decryption is not impossible (Step D5).

Next, the verified result generation unit 404 produces, based on the determined result {ID_i} as input, {(DEC(T_i[0](+)Q[0]), T_i[1])} corresponding to the determined result {ID_i} as the verified result (Step D6). However, when the result of Expression 1 for all of i=1, ..., m is that decryption is impossible, the verified result generation unit 404 produces a symbol indicating that there is no match as the verified result. In the first example, the verified result may be, as described in a second example of this invention described later, output as registration data T_i[0]. In this case, Expression 2, which is described later, is replaced with Expression 2 described in the second example.

Next, the verified result reception unit 302 of the data matching request device 300 receives {(DEC(T_i[0](+)Q[0]), T_i[1])} as the verified result (Step D7). When there is no match, encrypted data corresponding to the input data z' to be verified is not registered, and hence subsequent operation is stopped. When there is a verification, the processing proceeds to the following steps.

Next, the data restoration unit 303 calculates $$DEC(T\_i[0](+)Q[0])(+)R=x \quad \text{(Expression 2)}$$

for each i based on the verified result {(DEC(T_i[0](+)Q[0]), T_i[1])} as input. The verified result {(DEC(T_i[0](+)Q[0])} includes an element that can be decrypted in Expression 1, and hence there are no cases in Expression 2 in which decryption is impossible.

Next, the data restoration unit 303 uses the secret key x obtained in Expression 2 to confirm that T_i[1]=g^x (Step D8).

In this way, in the first example, it can be guaranteed that a data verifying request Q[0] that is accepted cannot be created unless input data z' to be verified that is close to the input data z to be concealed is used. The reason for this is that only a person who knows the input data z to be concealed can extract the secret key x, and only a person who knows the secret key x can generate a verification key g^x that is accepted. As a result, even when verification processing is performed a plurality of times, or even when the database owner who is performing the verification processing has malicious intent, generation of the input data z' to be verified that is transmitted by the user during verifying without knowing the verifying source data z (input data to be concealed) can be prevented.

EXAMPLE 2

Next, the second example of this invention is described in detail with reference to the drawings. The second example is an example of the second example embodiment of this invention.

In order to describe the second example, first, an "electronic signature" to be used in the second example is described. The electronic signature is formed from three algorithms (i.e., signature key generation, signature generation, and signature verification). Each of those three algorithms is described below.

The signature key generation algorithm (SigKeyGen), which is a probabilistic algorithm for generating a signature key sk and a verification key vk based on the security parameter k as input, is written as (sk, vk)←SigKeyGen(1^k).

The signature generation algorithm (Sign), which is a probabilistic algorithm for outputting a signature σ for M based on the signature key sk and the message M for the signature as input, is written as (σ, M)←Sign(sk, M).

The signature verification algorithm (Verify), which is a deterministic algorithm for outputting a signature verification result and acceptance or non-acceptance based on the verification key vk, the signature a, and the message M for the signature as input, is written as {acceptance, non-acceptance}←Verify(vk, σ, M).

In the electronic signature method, acceptance←Verify (vk, Sign(sk, M)) occurs at a probability of 1 for the verification key vk and the signature key sk, which is generated based on an arbitrary message M and a signature key generation algorithm SigKeyGen(1^k). The electronic signature method satisfies a property of being impossible to forge, namely, that a signature that is accepted cannot be generated by an arbitrary attacker who does not know the signature key sk even if, for example, the attacker can obtain a plurality of pairs of a signature that is accepted and the message.

As electronic signatures that satisfy the property of being impossible to forge, there are known a Schnorr signature and a Cramer-Shoup signature, for example. This invention operates regardless of the type of signature method as long as the method satisfies the property of being impossible to forge, and hence this invention is described based on a general electronic signature method.

Next, the second example of this invention in which an electronic signature method is used is described. Operation of the encrypted text verification system according to the second example of this invention is broadly divided into two phases, namely, a data registration phase and an encrypted text verification phase.

Figure 15:
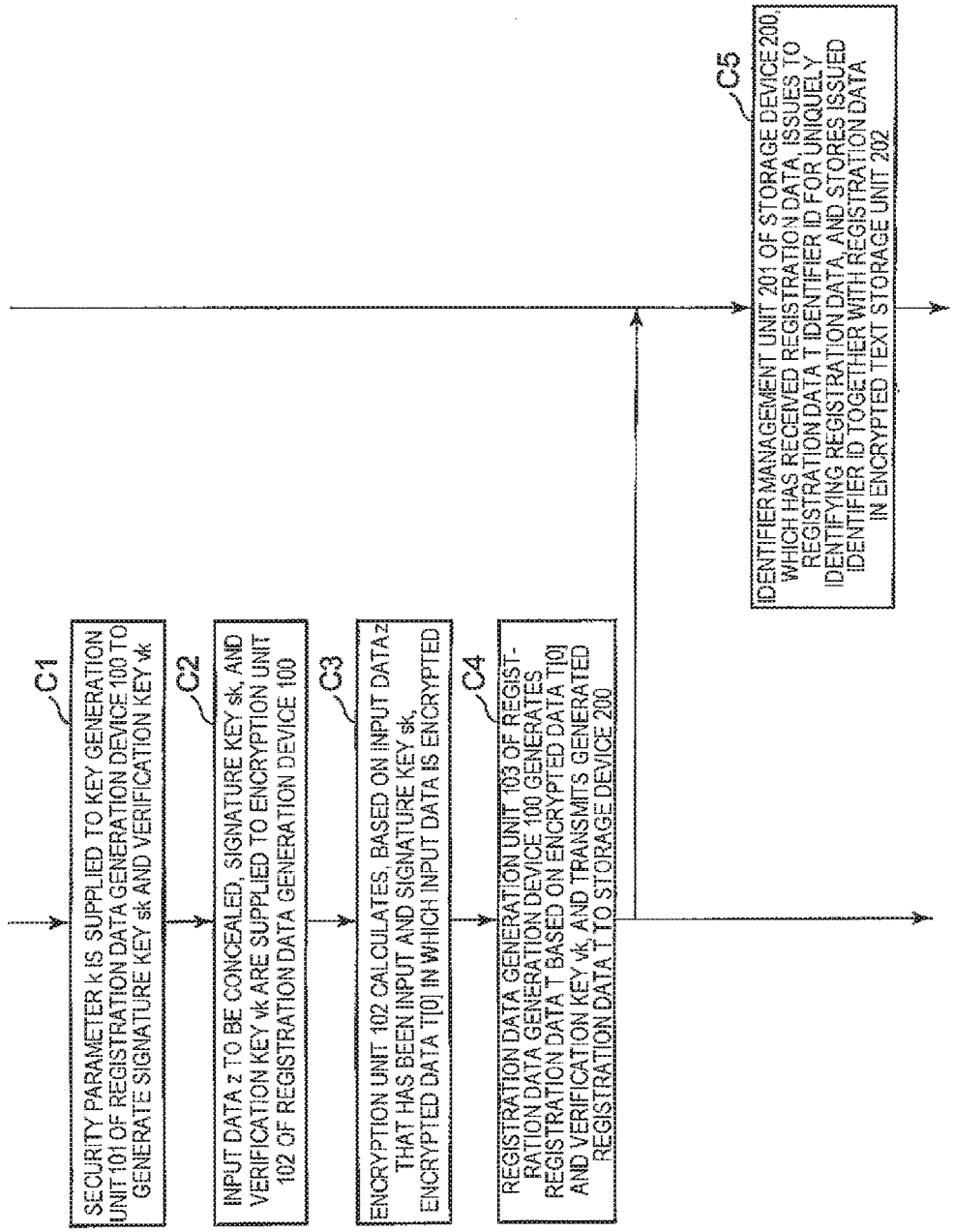
FIG. 15 is a flowchart for illustrating an operation example of a data registration phase of an encrypted text verification system according to a second example of this invention.

Referring to FIG. 15, in the data registration phase, first, a security parameter k is supplied to the key generation unit 101 of the registration data generation device 100 to generate the signature key sk and the verification key vk by the signature key generation algorithm SigKeyGen(1^k) (Step C1). The security parameter k is a parameter for determining the length of the signature key of the electronic signature.

Next, the input data z to be concealed, the signature key sk, and the verification key vk are supplied to the encryption unit 102 of the registration data generation device 100 (Step C2). In the second example, the input data z to be concealed is data of N bits.

Next, the encryption unit 102 generates ENC(sk) by performing BCH error-correction coding on the signature key sk based on the input data z and the signature key sk that have been input. Next, the encryption unit 102 generates encrypted data T[0]=z(+)ENC(sk) (Step C3). In the second example, the encryption unit 102 generates a code ENC(sk) of the signature key sk, but the encryption unit 102 may instead generate a code of a seed for generating the signature key sk. From a security perspective, it is desired that the seed be about 80 bits.

Next, the registration data generation unit 103 of the registration data generation device 100 generates registration data T=(T[0], T[1]=vk) based on the encrypted data T[0] and the verification key vk, and transmits the generated registration data T=(T[0], T[1]=vk) to the storage device 200 (Step C4).

Next, the identifier management unit 201 of the storage device 200, which has received the registration data, issues to the registration data T an identifier ID for uniquely identifying the registration data and stores the issued identifier ID together with the registration data in the encrypted text storage unit 202 (Step C5).

Figure 16:
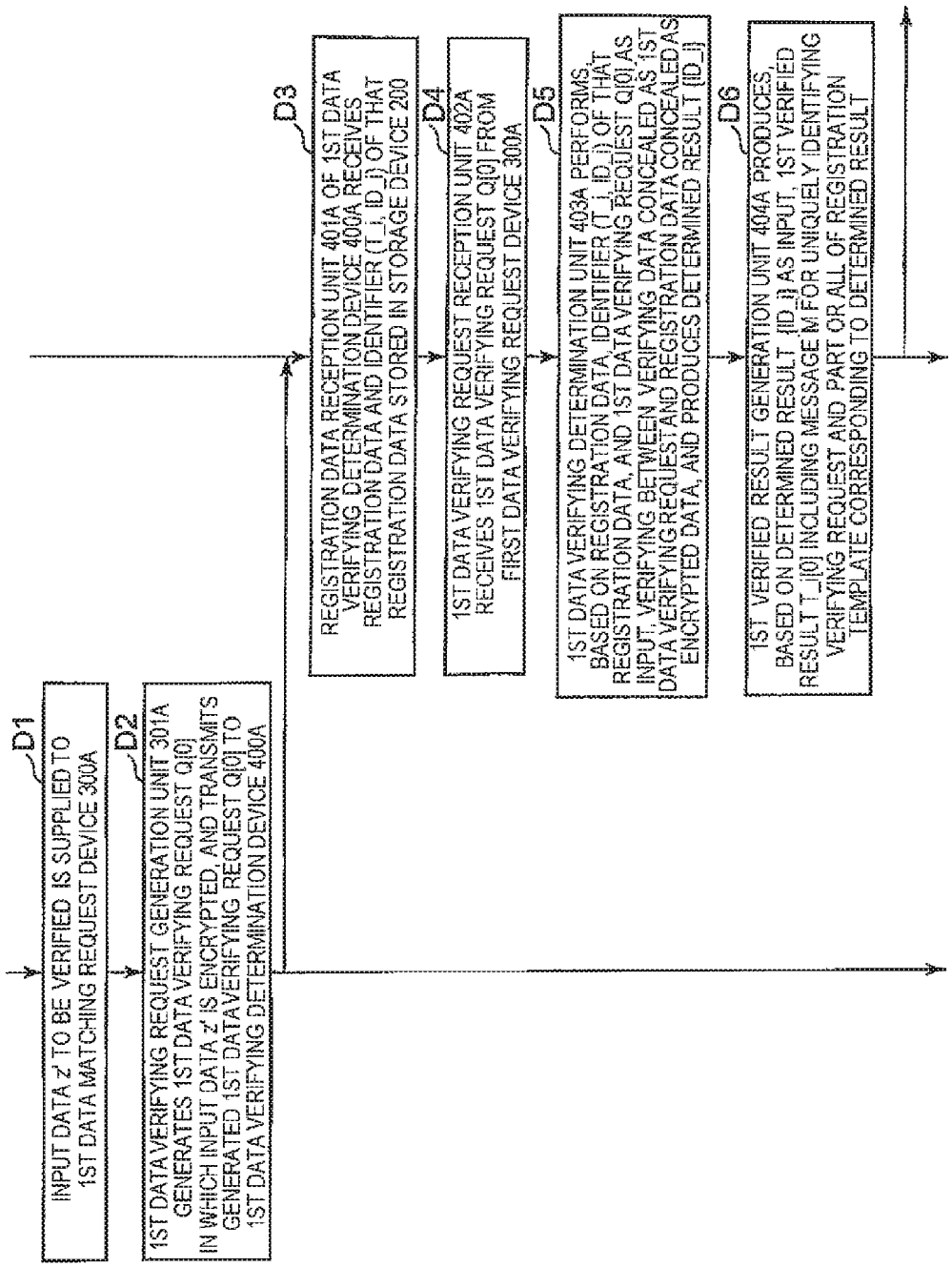
FIG. 16 is a flowchart for illustrating an operation example of a first half of an encrypted text verification phase of the encrypted text verification system according to the second example of this invention.

Referring to FIG. 16, in the encrypted text verification phase, first, input data z' to be verified is supplied to the first data verifying request device 300A (Step D1).

Next, the first data verifying request generation unit 301A generates BCH encoded data ENC(R) of a random number R based on the input data z' to be verified as input. The first data verifying request generation unit 301A generates a first data verifying request Q[0]=z'(+)ENC(R), and transmits the generated first data verifying request to the first data verifying determination device 400A (Step D2).

Next, the registration data reception unit 401A of the first data verifying determination device 400 receives the registration data and the identifier {(T_1, ID_1), (T_2, ID_2) ..., (T_m, ID_m)} of that registration data, which are stored in the storage device 200 (Step D3). In the second example, T_i=(T_i[0], T_i[1]) is the registration data (i.e., registration template) generated by the registration data generation device 100. In order to describe this point, in the second example, m pieces of registration data are stored in the storage device 200, and those m pieces of registration data are each denoted as (T_i, ID_i) (where i is from 1 to m).

Next, the first data verifying request reception unit 402A receives a first data verifying request Q[0] from the first data verifying request device 300A (Step D4).

Next, the first data verifying determination unit 403A calculates $$DEC(T\_i[0](+)Q[0]) \qquad \text{(Expression 1)}$$

for i=1, ..., m, based on the registration data, the identifier {(T_1, ID_1), (T_2, ID_2) ..., (T_m, ID_m)} of that registration data, and the first data verifying request Q[0] as input. In the second example, DEC(x) means BCH decoding of x. When the input data z to be concealed input when generating the registration data T_i and the input data z' to be verified input when generating the first data verifying request Q[0] are close values (in terms of their Hamming distance), the result of Expression 1 becomes sk(+)R. When the input data z to be concealed and the input data z' to be verified are not close values, a symbol indicating that decryption is impossible is output. The first data verifying determination unit 403A produces, as the determined result, a set {ID_i} of the identifiers ID_i corresponding to the registration data T_i[0] for which the result is that decryption is not impossible (Step D5).

Next, the first verified result generation unit 404A randomly selects, based on the determined result {ID_i} as input, a message M for uniquely identifying the verifying request to produce a set {T_i[0]} of the registration data corresponding to the message M and the determined result {ID_i} as the first verifying result (Step D6). However, when the result of Expression 1 for all of i=1 . . . , m is that decryption is impossible, the first verified result generation unit 404A produces a symbol indicating that there is no verification as the first verified result. In the second example, the first verified result generation unit 404A produces the registration data T_i[0] as the first verified result, but similarly to the first example, the calculation result of Expression 1, namely, DEC(T_i[0](+)Q[0]), may be produced as the first verified result. In this case, Expression 2, which is described later, is replaced with Expression 2 described in the first example.

Figure 17:
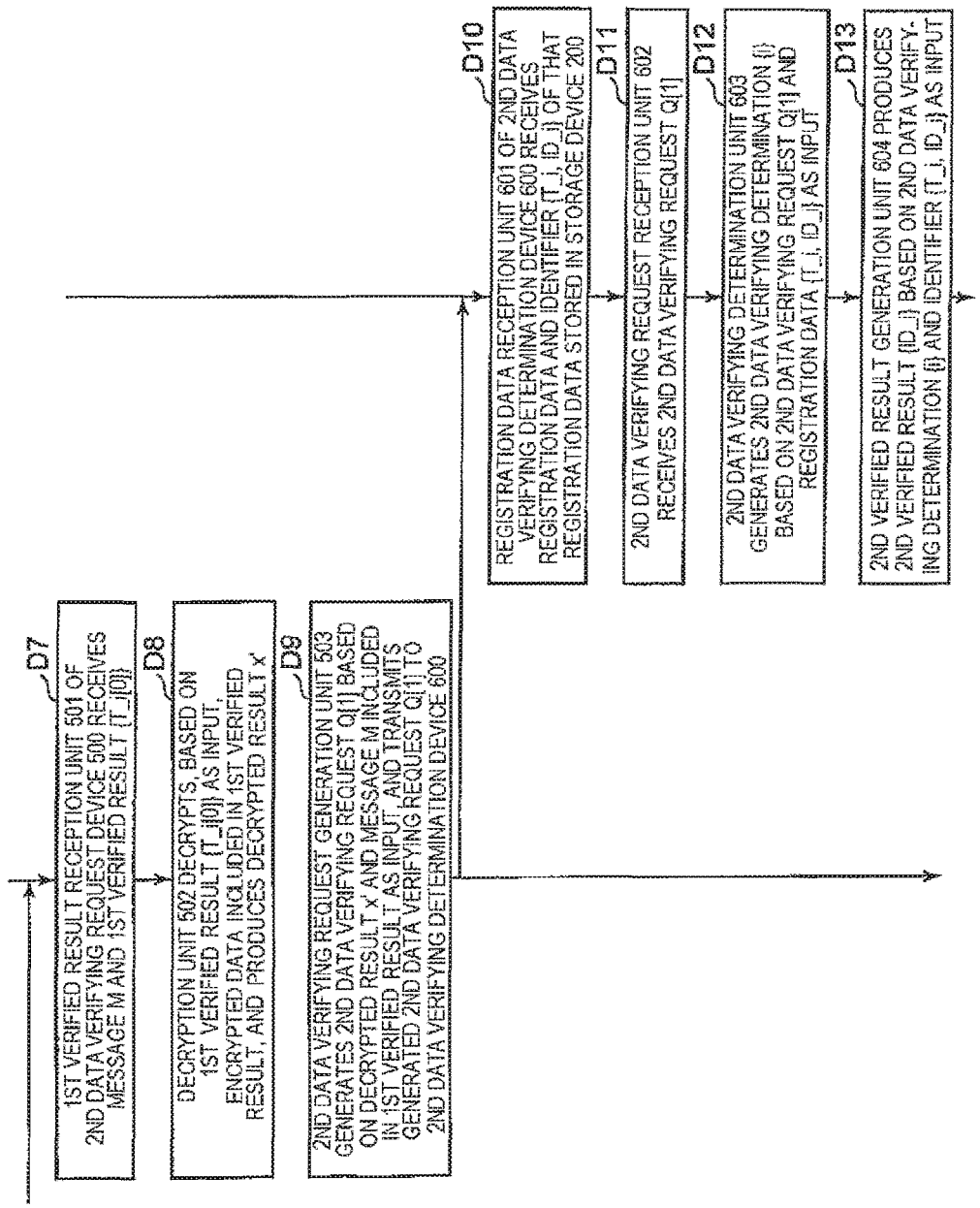
FIG. 17 is a flowchart for illustrating an operation example of a second half of the encrypted text verification phase of the encrypted text verification system according to the second example of this invention.

Referring to FIG. 17, next, the first verified result reception unit 501 of the second data verifying request device 500 receives the message M and the first verified result {T_i[0]} as the first verified result (Step D7). When there is no verification for the first verified result, registration data corresponding to the input data z' to be verified is not registered, and hence subsequent operation is stopped. When there is a verification, the processing proceeds to the following steps.

Next, the decryption unit 502 calculates $$\mathrm{DEC}(T\_i[0](+)z')=x'$$ (Expression 2)

for each i based on the first verified result {T_i[0]} as input (Step D8). The first verified result {T_i[0]} includes an element that can be decrypted in Expression 1, and hence there are no cases in Expression 2 in which decryption is impossible.

Next, the second data verifying request generation unit 503 performs signature generation Sign(M, x')=σ based on the decryption result x' and the message M included in the first verified result as input. The second data verifying request generation unit 503 transmits the second data verifying request Q[1]=σ to the second data verifying determination device 600 (Step D9).

Next, the registration data reception unit 601 of the second data verifying determination device 600 receives the registration data and the identifier {(T_1, ID_1), . . . , (T_m, ID_m)} stored in the storage device 200 (Step D10).

Next, the second data verifying request reception unit 602 receives the second data verifying request Q[1] (Step D11).

Next, the second data verifying determination unit 603 calculates

Verify(T_i[1],Q[1],M)

for each i=1, . . . , m based on the second data verifying request Q[1] and the registration data {(T_1, ID_1), . . . , (T_m, ID_m)} as input. The second data verifying determination unit 603 produces a set {i} of elements i having a result indicating acceptance as the second data verifying determination (Step D12). In the second example, the registration template {(T_1, ID_), . . . , (T_m, ID_m)} is supplied to the second data verifying determination unit 603, but the processing may also be performed by using only the registration data included in the first data verified result.

Next, the second verified result generation unit 604 produces, based on the second data verifying determination {i}, the registration data, and the identifier {(T_1, ID_1), . . . , (T_m, ID_m)} as input, a set {ID_i} of the identifiers ID_i corresponding to the elements i included in the second data verifying determination {i} as the second verified result (Step D13). In the second example, the input to the second verifying result generation unit 604 includes the registration data and the identifier {(T_1, ID_1), . . . , (T_m, ID_m)}, but the processing may also be performed by using only the registration data included in the first data verified result.

In this way, in the second example, it can be guaranteed that data verifying requests Q[0] and Q[1] that is accepted are not created unless input data z' to be verified that is close to the input data z to be concealed is used. The reason for this is that only a person who knows the input data z to be concealed can extract the signature key sk, and only a person who knows the signature key sk can generate a verification key vk that is received. As a result, even when verification processing is performed a plurality of times, or even when the database owner who is performing the verification processing has malicious intent, generation of the input data z' to be verified that is transmitted by the user during verifying without knowing the verifying source data (input data to be concealed) z can be prevented.

EXAMPLE 3

Next, a third example of this invention is described. The third example is also an example of the second example embodiment of this invention.

In the third example, "public-key encryption" is used, and hence public-key encryption is described first.

Public-key encryption is formed from three algorithms (i.e., key generation, encryption, and decryption). Each of those algorithms is now described.

The key generation algorithm (KeyGen), which is a probabilistic algorithm for generating a secret key sk and an encryption key pk based on the security parameter k as input, is written as (sk, pk)←KeyGen(1^k).

The encryption algorithm (Encrypt), which is a probabilistic algorithm for outputting an encrypted text cipher with respect to M based on a public key pk and the message M to be encrypted as input, is written as cipher←Encrypt(pk, M).

The decryption algorithm (Decrypt), which is a deterministic algorithm for outputting a plaintext M' based on the secret key sk and the encrypted text cipher as input, is written as M'←Decrypt(sk, cipher).

In a public key cryptosystem, M←Decrypt(sk, Encrypt(pk, M)) occurs at a probability of 1 for an arbitrary message M, a public key pk, and a secret key sk generated by a key generation algorithm KeyGen(1^k). The public key cryptosystem satisfies the property that an arbitrary attacker who does not know the secret key sk cannot obtain any information relating to the encrypted data even when a plurality of plaintexts can be obtained by the attacker for an arbitrary encrypted text (i.e., property of being unidentifiable by a chosen-ciphertext attack).

As public key encryption that satisfies the property of being unidentifiable by a chosen-ciphertext attack, there is known Cramer-Shoup encryption, for example. This invention operates regardless of the type of public key cryptosystem as long as the cryptosystem satisfies the property of being unidentifiable by a chosen-ciphertext attack, and hence this invention is described based on a general public key cryptosystem.

Next, description is made of the third example of this invention in which a public key cryptosystem is used. Operation of the encrypted text verification system according to the third example of this invention is broadly divided into two phases, namely, a data registration phase and an encrypted text verification phase.

Figure 18:
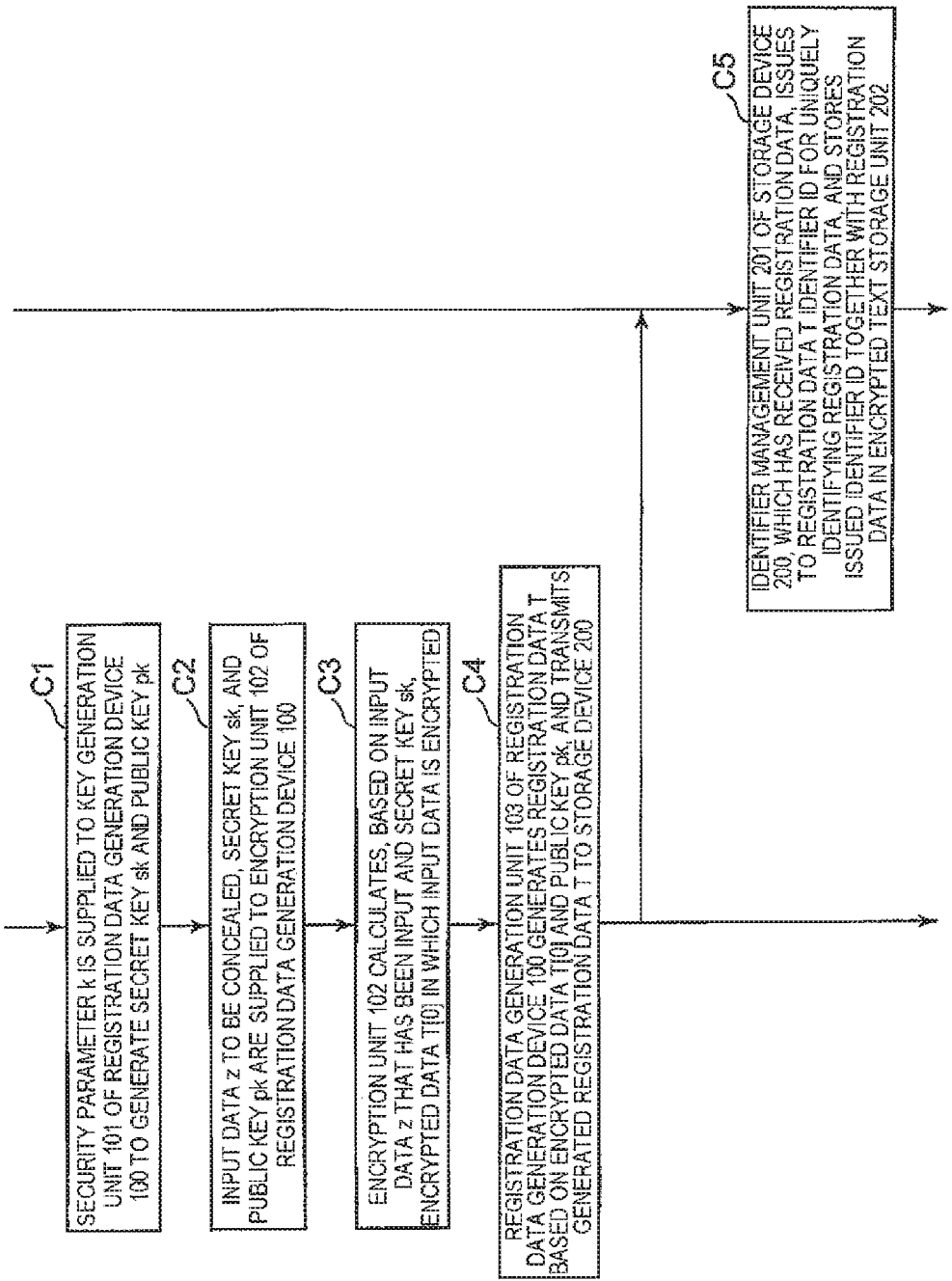
FIG. 18 is a flowchart for illustrating an operation example of a data registration phase of an encrypted text verification system according to a third example of this invention.

Referring to FIG. 18, in the data registration phase, first, a security parameter k is input to the key generation unit 101 of the registration data generation device 100 to generate a secret key sk and a public key pk by the key generation algorithm KeyGen(1^k) (Step C1). The security parameter k is a parameter for determining the length of the secret key in the public key encryption.

Next, the input data z to be concealed, the secret key sk, and the public key pk are supplied to the encryption unit 102 of the registration data generation device 100 (Step C2). In the third example, the input data z to be concealed is data of N bits.

Next, the encryption unit 102 generates ENC(sk) by performing BCH error-correction coding on the secret key sk based on the input data z and the secret key sk that have been input. Next, the encryption unit 102 generates encrypted data T[0]=z(+)ENC(sk) (Step C3). In the third example, the encryption unit 102 generates a code ENC(sk) of the secret key sk, but the encryption unit 102 may instead generate a code of a seed for generating the secret key sk.

From a security perspective, it is desired that the seed be about 80 bits.

Next, the registration data generation unit 103 of the registration data generation device 100 generates registration data T=(T[0], T[1]=pk) based on the encrypted data T[0] and the public key pk, and transmits the generated registration data T=(T[0], T[1]=pk) to the storage device 200 (Step C4).

Next, the identifier management unit 201 of the storage device 200, which has received the registration data, issues to the registration data T an identifier ID for uniquely identifying the registration data, and stores the issued identifier ID together with the registration data in the encrypted text storage unit 202 (Step C5).

Figure 19:
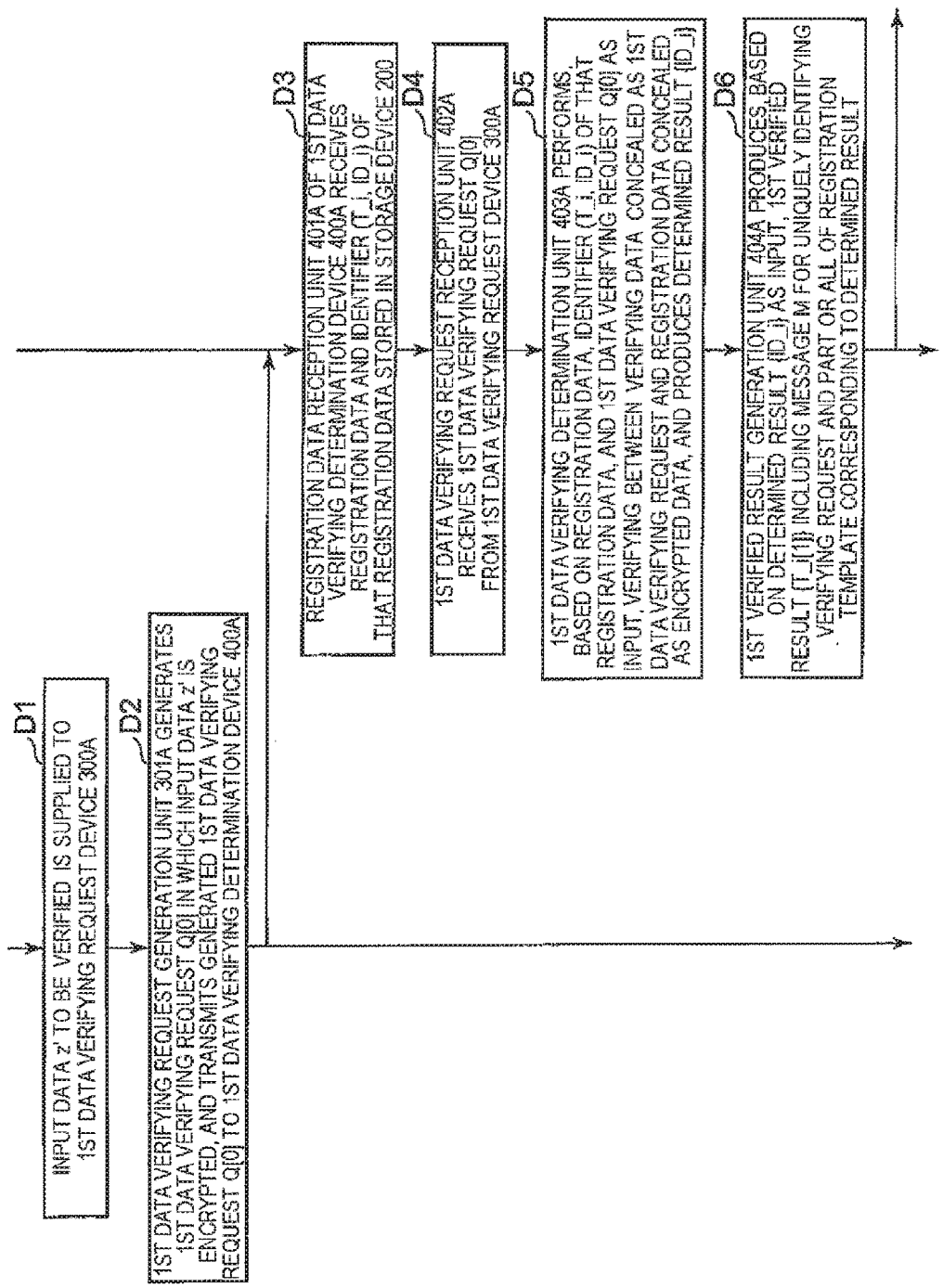
FIG. 19 is a flowchart for illustrating an operation example of a first half of an encrypted text verification phase of the encrypted text verification system according to the third example of this invention.

Referring to FIG. 19, in the encrypted text verification phase, first, input data z' to be verified is supplied to the first data verifying request device 300A (Step D1).

Next, the first data verifying request generation unit 301A generates BCH encoded data ENC(R) of a random number R based on the input data z' as input. The first data verifying request generation unit 301A generates a first data verifying request Q[0]=z'(+)ENC(R), and transmits the generated data verifying request to the first data verifying determination device 400A (Step D2).

Next, the registration data reception unit 401A of the first data verifying determination device 400A receives the registration data and the identifier {(T_1, ID_1), (T_2, ID_2) . . . , (T_m, ID_m)} of that registration data, which are stored in the storage device 200 (Step D3). In the third example, T_i=(T_i[0], T_i[1]) is the registration data (i.e., registration template) generated by the registration data generation device 100. In order to describe this point, in the third example, m pieces of registration data are stored in the storage device 200, and those m pieces of registration data are each denoted as (T_i, ID_i) (where i is from 1 to m).

Next, the first data verifying request reception unit 402A receives a first data verifying request Q[0] from the first data verifying request device 300A (Step D4).

Next, the first data verifying determination unit 403A calculates $$DEC(T\_i[0](+)Q[0])$$ (Expression 1)

for i=1, . . . , m, based on the registration data, the identifier {(T_1, ID_1), (T_2, ID_2) . . . , (T_m, ID_m)} of that registration data, and the first data verifying request Q[0] as input. In the second example, DEC(x) means BCH decoding of x. When the input data z to be concealed input when generating the registration data T_i and the input data z' to be verified input when generating the first data verifying request Q[0] are close values (in terms of their Hamming distance), the result of Expression 1 becomes sk(+)R When the input data z to be concealed and the input data z' to be verified are not close values, a symbol indicating that decryption is not impossible is output. The first data verifying determination unit 403A produces, as the determined result, a set {ID_i} of the identifiers ID_i corresponding to the encrypted data T_i[0] of the registration data for which the result is that decryption is not impossible (Step D5).

Next, the first verified result generation unit 404A randomly selects, based on the determined result {ID_i} as input, a message M uniquely specifying the verifying request, and produces as the first verified result the message M and a public key set {T_i[1]} of the registration data corresponding to the determined result {ID_i} (Step D6). However, when the result of Expression 1 for all of i=1, . . . , m is that decryption is impossible, the verified first result generation unit 404A produces a symbol indicating that there is no verification as the first verified result. In the third example, the first verified result generation unit 404A produces the public key T_i[1] of the registration data as the first verified result, but similarly to the first example, the calculation result of Expression 1, namely, DEC(T_i[0](+)Q[0]), may be produce as the first verified result. In that case, Expression 2, which is described later, is replaced with the Expression 2 described in the first example.

Figure 20:
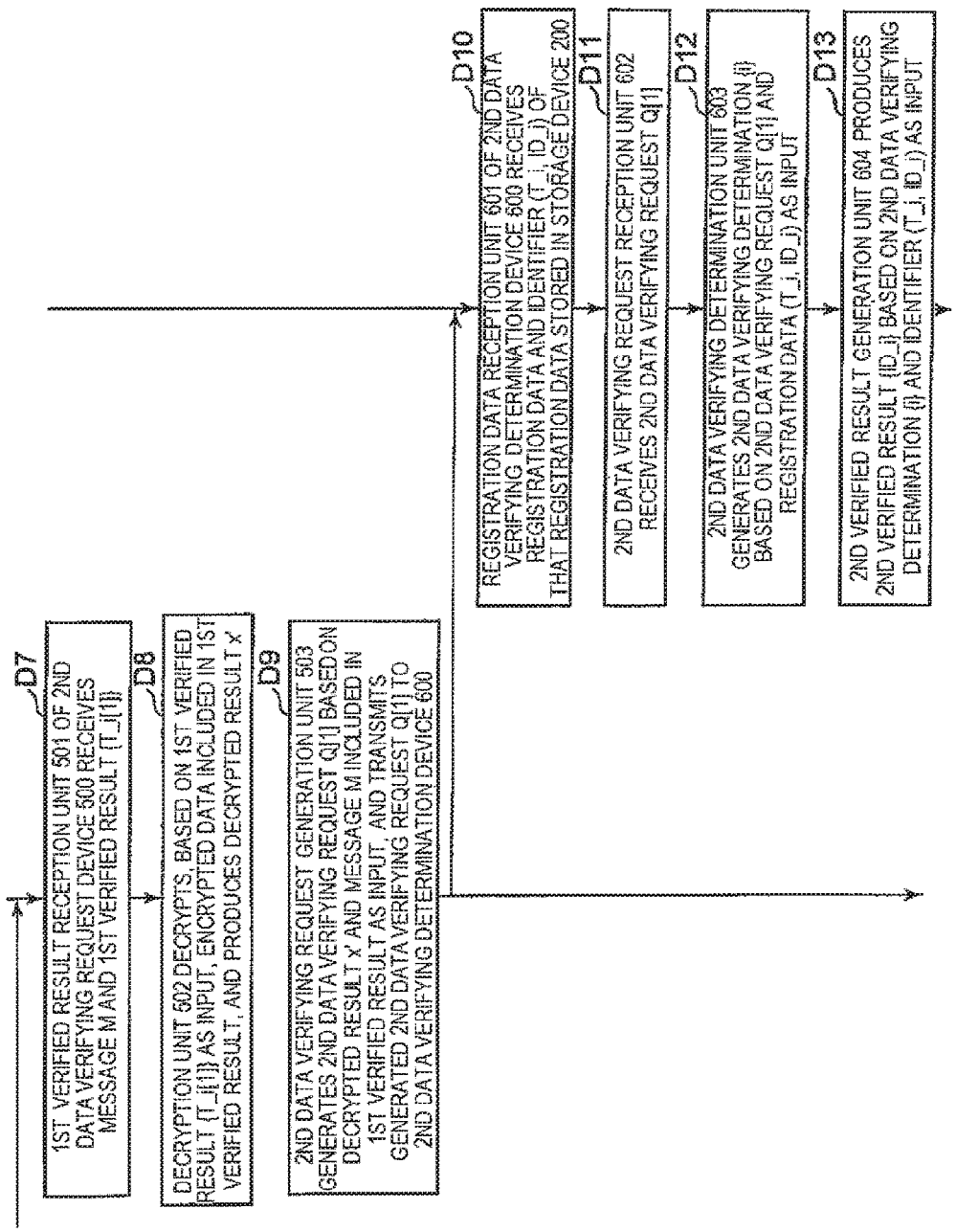
FIG. 20 is a flowchart for illustrating an operation example of a second half of the encrypted text verification phase of the encrypted text verification system according to the third example of this invention.

Referring to FIG. 20, next, the first verified result reception unit 501 of the second data verifying request device 500 receives the message M and a first verified result {T_i[1]} as the first verified result (Step D7). When there is no verification for the first verified result, encrypted data corresponding to the input data z' to be verified is not registered, and hence subsequent operation is stopped. When there is a verification, the processing proceeds to the following steps.

Next, the decryption unit 502 calculates $$DEC(T\_i[1](+)z')=x'$$ (Expression 2)

for each i based on the first verified result {T_i[1]} as input (Step D8). The first verified result {T_i[1]} includes an element that can be decrypted in Expression 1, and hence there are no cases in Expression 2 in which decryption is impossible.

Next, the second data verifying request generation unit 503 performs encryption, namely, Encrypt(x', M)=cipher, based on the decrypted result x' and the message M included in the first verified result as input. The second data verifying request generation unit 503 transmits the second data verifying request Q[1]=cipher to the second data verifying determination device 600 (Step D9).

Next, the registration data reception unit 601 of the second data verifying determination device 600 receives the registration data and the identifier {(T_1, ID_1), . . . , (T_m, ID_m)} stored in the storage device 200 (Step S10).

Next, the second data verifying request reception unit 602 receives the second data verifying request Q[1] (Step D11).

Next, the second data verifying determination unit 603 calculates $$\text{Decrypt}(T\_i[1], Q[1])$$

for each i=1, ..., m based on the second data verifying request Q[1] and the registration data {(T_1, ID_1), ..., (T_m, ID_m)} as input. The second data verifying determination unit 603 produects a set {i} of elements i having a result indicating acceptance as the second data verifying determination (Step D12). In the third example, the registration data {(T_1, ID_1), ..., (T_m, ID_m)} is supplied to the second data verifying determination unit 603, but the processing may also be performed by using only the registration data included in the first data verified result (T_i[1]).

Next, the second verified result generation unit 604 produces, based on the second data verifying determination {i}, the registration data, and the identifier {(T_1, ID_1), ..., (T_m, ID_m)} as input, a set {ID_i} of the identifiers ID_i corresponding to the elements i included in the second data verifying determination {i} as the second verified result (Step D13). In the second example, the input to the second verified result generation unit 604 includes the registration data and the identifier {(T_1, ID_1), ..., (T_m, ID_m)}, but the processing may also be performed by using only the registration data included in the first data verifying result {T_i[1]}.

In this way, in the third example, it can be guaranteed that data verifying requests Q[0] and Q[1] that is accepted are not created unless input data z' to be verified that is close to the input data z to be concealed is used. The reason for this is that only a person who knows the input data z to be concealed can extract the secret key sk, and only a person who knows the secret key sk can generate a public key pk that is accepted. As a result, even when verification processing is performed a plurality of times, or even when the database owner who is performing the verification processing has malicious intent, generation of the input data z' to be verified that is transmitted by the user during verifying without knowing the verifying source data (input data to be concealed) z can be prevented.

OTHER EXAMPLES

In this invention, confirmation may also be performed by using, in place of using an electronic signature or public-key encryption as described in the second example and the third example, a message authentication code (MAC) after key exchange has been performed. Another method may also be used, as long as the method enables confirmation on the verification processing side of the fact that x obtained by the person requesting verifying is the correct value.

The method described in this invention may also be stored in and distributed via a recording medium, for example, a flexible disk, a hard disk, or other such magnetic disk, a compact-disc (CD) read-only memory (ROM), a digital versatile disc (DVD), or other such optical disc, a magneto-optical disc (MO), or a semiconductor memory, as a program capable of causing a computer to execute the method described in this invention.

The recording medium may store the program in any format, as long as the recording medium is capable of storing the program and the recording medium can be read by a computer.

For example, an operating system, database management software, or network software or other such middleware, which runs on a computer based on instructions from a program installed in the computer from the recording medium, may execute a part of each process.

The storage medium in this invention is not limited to a medium independent from the computer, and the storage medium may be a medium in which a program transmitted via a local area network (LAN) or the Internet is downloaded and stored or temporarily stored.

The number of storage media is not limited to one medium. The storage medium of this invention includes a case in which the processing of the above-mentioned embodiments is executed from a plurality of media. The configuration of the medium may be any configuration.

The computer in this invention is configured to execute each process based on a program stored in the recording medium. The computer may be any configuration, for example, a device built from a personal computer or a system in which a plurality of devices are connected via a network.

The computer in this invention is not limited to a personal computer. The computer may be a calculation processing device included in an information processing machine, and a machine or a device capable of implementing the functions of this invention by a program.

This invention is not strictly limited to the above-mentioned example embodiments, and can be embodied while the components are modified without departing from the gist thereof at an embodiment stage. Moreover, various inventions can be formed by properly combining a plurality of components. For example, some components may be removed from all the components described in the example embodiments. Moreover, the components may be combined as appropriate.

The whole or part of the example embodiments described above can be described as, but not limited to, in the following supplementary notes.

(Supplementary Note 1)

An encrypted text verification system, including:

an encryption unit configured to calculate encrypted data by encrypting input data to be concealed by using a secret key;

a registration data generation unit configured to generate registration data based on the encrypted data and a verification key;

a storage device configured to store the registration data as a registration template in a storage unit together with an identifier for uniquely identifying the registration data;

a data verifying request generation unit configured to generate a data verifying request in which input data to be verified has been encrypted by using a random number;

a data verifying determination unit configured to verify the registration template stored in the storage unit and the data verifying request to produce a determined result;

a verified result generation unit configured to produce a verified result including a part or all of the registration template corresponding to the determined result; and a data restoration unit configured to restore data based on the verified result to produce a restored result.

(Supplementary Note 2)

The encrypted text verification system according to Supplementary note 1, further including a key generation unit configured to generate the secret key and the verification key from a security parameter.

(Supplementary Note 3)

The encrypted text verification system according to Supplementary note 1 or 2, wherein the encryption unit is configured to calculate the encrypted data by taking an exclusive OR between the input data to be concealed and an error-correcting code generated by performing error-correction coding on the secret key, and wherein the data verifying request generation unit is configured to generate the data verifying request by taking an exclusive OR between the input data to be verified and an error-correcting code obtained by performing error-correction coding on the random number.

(Supplementary Note 4)

The encrypted text verification system according to Supplementary note 3, wherein the data verifying determination unit is configured to produce the determined result by performing error-correction decoding on an exclusive OR between the data verifying request and the encrypted data included in the registration template.

(Supplementary Note 5)

The encrypted text verification system according to Supplementary note 4, wherein the verified result generation unit is configured to produce, as the verified result, a result obtained by adding to the determined result the verification key included in the registration template corresponding to the determined result.

(Supplementary Note 6)

The encrypted text verification system according to Supplementary note 5, wherein the data restoration unit is configured to obtain the restored result by calculating an exclusive OR between the random number and the determined result included in the verified result, and to verify the restored result by using the verification key.

(Supplementary Note 7)

The encrypted text verification system according to Supplementary note 4, wherein the verified result generation unit is configured to produce, as the verified result, the encrypted data included in the registration template corresponding to the determined result.

(Supplementary Note 8)

The encrypted text verification system according to Supplementary note 7, wherein the data restoration unit is configured to obtain the restored result by performing error-correction decoding on an exclusive OR between the verified result and the input data to be verified.

(Supplementary Note 9)

An encrypted text verification system, including:

an encryption unit configured to calculate encrypted data by encrypting input data to be concealed by using a signature key;

a registration data generation unit configured to generate registration data based on the encrypted data and a verification key;

a storage device configured to store the registration data as a registration template in a storage unit together with an identifier for uniquely identifying the registration data;

a first data verifying request generation unit configured to generate a first data verifying request in which input data to be verified has been encrypted by using a random number;

a first data verifying determination unit configured to verify the registration template stored in the storage unit and the first data verifying request to produce a determined result;

a first verified result generation unit configured to produce, as a first verified result, a combination of a message that has been randomly selected and a part or all of the registration template corresponding to the determined result;

a decryption unit configured to decrypt the first verified result to produce a decrypted result;

a second data verifying request generation unit configured to generate a second data verifying request based on the decrypted result and the message included in the first verified result;

a second data verifying determination unit configured to generate a second data verifying determination based on the second data verifying request and the registration data of the registration template recorded in the storage unit; and a second verified result generation unit configured to produce, as a second verified result, an identifier of the registration data corresponding to the second data verifying determination.

(Supplementary Note 10)

The encrypted text verification system according to Supplementary note 9, further including a key generation unit configured to generate the signature key and the verification key from a security parameter.

(Supplementary Note 11)

The encrypted text verification system according to Supplementary note 9 or 10, wherein the encryption unit is configured to calculate the encrypted data by taking an exclusive OR between the input data to be concealed and an error-correcting code generated by performing error-correction coding on the signature key, and wherein the first data verifying request generation unit is configured to generate the first data verifying request by taking an exclusive OR between the input data to be verified and an error-correcting code obtained by performing error-correction coding on the random number.

(Supplementary Note 12)

The encrypted text verification system according to Supplementary note 11, wherein the first data verifying determination unit is configured to perform error-correction decoding on an exclusive OR between the first data verifying request and the encrypted data included in the registration data of the registration template, and to produce, as the determined result, a set of identifiers corresponding to the encrypted data for which a result is that decryption is not impossible.

(Supplementary Note 13)

The encrypted text verification system according to Supplementary note 12, wherein the first verified result generation unit is configured to produce, as the first verified result, a combination of the message that has been randomly selected and the encrypted data included in the registration data of the registration template corresponding to the determined result.

(Supplementary Note 14)

The encrypted text verification system according to Supplementary note 13, wherein the decryption unit is configured to obtain the decrypted result by performing error-correction decoding on an exclusive OR between the input data to be verified and the encrypted data included in the first verified result.

(Supplementary Note 15)

The encrypted text verification system according to Supplementary note 12, wherein the first verified result generation unit is configured to produce, as the first verified result, a combination of the message that has been randomly selected and the determined result.

(Supplementary Note 16)

The encrypted text verification system according to Supplementary note 15, wherein the decryption unit is configured to obtain the decrypted result by calculating an exclusive OR between the random number and the determined result included in the first verified result.

(Supplementary Note 17)

The encrypted text verification system according to any one of Supplementary notes 12 to 16, wherein the second data verifying request generation unit is configured to generate the second verifying request by signing and generating the decrypted result and the message included in the first verified result.

(Supplementary Note 18)

The encrypted text verification system according to Supplementary note 17, wherein the second data verifying determination unit is configured to sign and verify the second verifying request, the message, and the registration data of the registration template recorded in the storage unit, and to generate, as the second data verifying determination, a set of identifier numbers having a result indicating acceptance.

(Supplementary Note 19)

The encrypted text verification system according to Supplementary note 18, wherein the second verified result generation unit is configured to produce, as the second verified result, an identifier of the registration data corresponding to the registration template corresponding to the second data verifying determination.

(Supplementary Note 20)

The encrypted text verification system according to Supplementary note 18, wherein the second verified result generation unit is configured to produce, as the second verified result, an identifier of the registration data included in the first data verified result corresponding to the second data verifying determination.

(Supplementary Note 21)

An encrypted text verification system, including:

an encryption unit configured to calculate encrypted data by encrypting input data to be concealed by using a secret key:

a registration data generation unit configured to generate registration data based on the encrypted data and a public key;

a storage device configured to store the registration data as a registration template in a storage unit together with an identifier for uniquely identifying the registration data;

a first data verifying request generation unit configured to generate a first data verifying request in which input data to be matched has been encrypted by using a random number;

a first data verifying determination unit configured to verify the registration template stored in the storage unit and the first data verifying request to produce a determined result;

a first verified result generation unit configured to produce, as a first verified result, a combination of a message that has been randomly selected and a part or all of the registration template corresponding to the determined result;

a decryption unit configured to decrypt the first verified result to produce a decrypted result:

a second data verifying request generation unit configured to generate a second data verifying request based on the decrypted result and the message included in the first verified result;

a second data verifying determination unit configured to generate a second data verifying determination based on the second data verifying request and the registration data of the registration template recorded in the storage unit; and a second verified result generation unit configured to produce, as a second verified result, an identifier of the registration data corresponding to the second data verifying determination.

(Supplementary Note 22)

The encrypted text verification system according to Supplementary note 21, further including a key generation unit configured to generate the secret key and the public key from a security parameter.

(Supplementary Note 23)

The encrypted text verification system according to Supplementary note 21 or 22, wherein the encryption unit is configured to calculate the encrypted data by taking an exclusive OR between the input data to be concealed and an error-correcting code generated by performing error-correction coding on the secret key, and wherein the first data verifying request generation unit is configured to generate the first data verifying request by taking an exclusive OR between the input data to be verified and an error-correcting code obtained by performing error-correction coding on the random number.

(Supplementary Note 24)

The encrypted text verification system according to Supplementary note 23, wherein the first data verifying determination unit is configured to perform error-correction decoding on an exclusive OR between the first data verifying request and the encrypted data included in the registration data of the registration template, and to produce, as the determined result, a set of identifiers corresponding to the encrypted data for which a result is that decryption is not impossible.

(Supplementary Note 25)

The encrypted text verification system according to Supplementary note 24, wherein the first verified result generation unit is configured to produce, as the first verified result, a combination of the message that has been randomly selected and the public key included in the registration data of the registration template corresponding to the determined result.

(Supplementary Note 26)

The encrypted text verification system according to Supplementary note 25, wherein the decryption unit is configured to obtain the decrypted result by performing error-correction decoding on an exclusive OR between the input data to be verified and the public key included in the first verified result.

(Supplementary Note 27)

The encrypted data verification system according to Supplementary note 24, wherein the first verified result generation unit is configured to produce, as the first verified result, a combination of the message that has been randomly selected and the determined result.

(Supplementary Note 28)

The encrypted text verification system according to Supplementary note 27, wherein the decryption unit is configured to obtain the decrypted result by calculating an exclusive OR between the random number and the determined result included in the first verified result.

(Supplementary Note 29)

The encrypted text verification system according to any one of Supplementary notes 24 to 28, wherein the second data verifying request generation unit is configured to generate the second verifying request by encrypting the decrypted result and the message included in the first verified result.

(Supplementary Note 30)

The encrypted text verification system according to Supplementary note 29, wherein the second data verifying determination unit is configured to decrypt the second verifying request and the registration data of the registration template recorded in the storage unit, and to generate, as the second data verifying determination, a set of identifier numbers having a result indicating acceptance.

(Supplementary Note 31)

The encrypted text verification system according to Supplementary note 30, wherein the second verified result generation unit is configured to produce, as the second verified result, an identifier of the registration data corresponding to the registration template corresponding to the second data verifying determination.

(Supplementary Note 32)

The encrypted text verification system according to Supplementary note 30, wherein the second verified result generation unit is configured to produce, as the second verified result, an identifier of the registration data included in the first data verified result corresponding to the second data verifying determination.

(Supplementary Note 33)

A biometric authentication system, including the encrypted text verification system of any one of Supplementary notes 1 to 32,
the input data to be concealed and the input data to be verified being biometric information,
the biometric authentication system being configured to perform biometric authentication by determining whether or not the input data to be concealed and the input data to be verified are similar.

(Supplementary Note 34)

A method of verifying encrypted text, the method including:
a data registration step including:
calculating, by a first client, encrypted data by encrypting input data to be concealed by using a secret key;
generating, by the first client, registration data based on the encrypted data and a verification key; and
storing, by a server, the registration data as a registration template in a storage unit together with an identifier for uniquely identifying the registration data: and
an encrypted text verifying step including:
generating, by a second client, a data verifying request in which input data to be verified has been encrypted by using a random number;
verifying, by the server, the registration template stored in the storage unit and the data verifying request to produce a determined result;
producing, by the server, a verified result including a part or all of the registration template corresponding to the determined result; and
restoring, by the second client, data based on the verified result to produce a restored result.

(Supplementary Note 35)

A method of verifying encrypted text, the method including:
an encryption step of calculating, by a first client, encrypted data by encrypting input data to be concealed by using a secret key;
a registration data generation step of generating, by the first client, registration data based on the encrypted data and a verification key;
a step of storing, by a server, the registration data as a registration template in a storage unit together with an identifier for uniquely identifying the registration data;
a data verifying request generation step of generating, by a second client, a data verifying request in which input data to be verified has been encrypted by using a random number;
a data verifying determination step of verifying, by the server, the registration template stored in the storage unit and the data verifying request to output a determined result;
a verified result generation step of producing, by the server, a verified result including a part or all of the registration template corresponding to the determined result; and
a data restoration step of restoring, by the second client, data based on the verified result to produce a restored result.

(Supplementary Note 36)

A method of verifying encrypted text, the method including:
a data registration step including:
calculating, by a first client, encrypted data by encrypting input data to be concealed by using a signature key;
generating, by the first client, registration data based on the encrypted data and a verification key; and
storing, by a server, the registration data as a registration template in a storage unit together with an identifier for uniquely identifying the registration data; and
an encrypted text verifying step including:
generating, by a second client, a first data verifying request in which input data to be verified has been encrypted by using a random number;
verifying, by the server, the registration template stored in the storage unit and the first data verifying request to produce a determined result;
producing, by the server, as a first verified result, a combination of a message that has been randomly selected and a part or all of the registration template corresponding to the determined result;
decrypting, by the second client, the first verified result to produce a decrypted result;
generating, by the second client, a second verifying request based on the decrypted result and the message included in the first verified result;
generating, by the server, a second data verifying determination based on the second verifying request and the registration data of the registration template recorded in the storage unit; and
producing, by the server, as a second verified result, an identifier of the registration data corresponding to the second data verifying determination.

(Supplementary Note 37)

A method of verifying encrypted text, the method including:

an encryption step of calculating, by a first client, encrypted data by encrypting input data to be concealed by using a signature key:

a registration data generation step of generating, by the first client, registration data based on the encrypted data and a verification key;

a step of storing, by a server, the registration data as a registration template in a storage unit together with an identifier for uniquely identifying the registration data;

a first data verifying request generation step of generating, by a second client, a first data verifying request in which input data to be verified has been encrypted by using a random number;

a first data verifying determination step of verifying, by the server, the registration template stored in the storage unit and the first data verifying request to produce a determined result;

a first verified result generation step of producing, by the server, as a first verified result, a combination of a message that has been randomly selected and a part or all of the registration template corresponding to the determined result;

a decryption step of decrypting, by the second client, the first verified result to produce a decrypted result;

a second data verifying request generation step of generating, by the second client, a second verifying request based on the decrypted result and the message included in the first verified result;

a second data verifying determination step of generating, by the server, a second data verifying determination based on the second verifying request and the registration data of the registration template recorded in the storage unit; and a second verified result generation step of producing, by the server, as a second verified result, an identifier of the registration data corresponding to the second data verifying determination.

(Supplementary Note 38)

A method of verifying encrypted text, the method including:

a data registration step including:

calculating, by a first client, encrypted data by encrypting input data to be concealed by using a secret key;

generating, by the first client, registration data based on the encrypted data and a public key; and storing, by a server, the registration data as a registration template in a storage unit together with an identifier for uniquely identifying the registration data; and an encrypted text verifying step including:

generating, by a second client, a first data verifying request in which input data to be verified has been encrypted by using a random number;

verifying, by the server, the registration template stored in the storage unit and the first data verifying request to produce a determined result;

producing, by the server, as a first verified result, a combination of a message that has been randomly selected and a part or all of the registration template corresponding to the determined result;

decrypting, by the second client, the first verified result to produce a decrypted result;

generating, by the second client, a second verifying request based on the decrypted result and the message included in the first verified result;

generating, by the server, a second data verifying determination based on the second verifying request and the registration data of the registration template recorded in the storage unit; and producing, by the server, as a second verified result, an identifier of the registration data corresponding to the second data verifying determination.

(Supplementary Note 39)

A method of verifying encrypted text, the method including:

an encryption step of calculating, by a first client, encrypted data by encrypting input data to be concealed by using a secret key;

a registration data generation step of generating, by the first client, registration data based on the encrypted data and a public key;

a step of storing, by a server, the registration data as a registration template in a storage unit together with an identifier for uniquely identifying the registration data;

a first data verifying request generation step of generating, by a second client, a first data verifying request in which input data to be verified has been encrypted by using a random number;

a first data verifying determination step of verifying, by the server, the registration template stored in the storage unit and the first data verifying request to produce a determined result;

a first verified result generation step of producing, by the server, as a first verified result, a combination of a message that has been randomly selected and a part or all of the registration template corresponding to the determined result;

a decryption step of decrypting, by the second client, the first verified result to produce a decrypted result;

a second data verifying request generation step of generating, by the second client, a second verifying request based on the decrypted result and the message included in the first verified result;

a second data verifying determination step of generating, by the server, a second data verifying determination based on the second verifying request and the registration data of the registration template recorded in the storage unit; and a second verified result generation step of producing, by the server, as a second verified result, an identifier of the registration data corresponding to the second data verifying determination.

(Supplementary Note 40)

A computer-readable recording medium having recorded thereon an encrypted text verification program for causing a computer to execute:

encryption processing for calculating encrypted data by encrypting input data to be concealed by using a secret key;

registration data generation processing for generating registration data based on the encrypted data and a verification key;

processing for storing the registration data as a registration template in a storage unit together with an identifier for uniquely identifying the registration data;

data verifying request generation processing for generating a data verifying request in which input data to be verified has been encrypted by using a random number;

data verifying determination processing for verifying the registration template stored in the storage unit and the data verifying request to produce a determined result;

verified result generation processing for producing a verified result including a part or all of the registration template corresponding to the determined result; and data restoration processing for restoring data based on the verified result to produce a restored result.

(Supplementary Note 41)

A computer-readable recording medium having recorded thereon an encrypted text verification program for causing a computer to execute:

encryption processing for calculating encrypted data by encrypting input data to be concealed by using a signature key;

registration data generation processing for generating registration data based on the encrypted data and a verification key;

processing for storing the registration data as a registration template in a storage unit together with an identifier for uniquely identifying the registration data:

first data verifying request generation processing for generating a first data verifying request in which input data to be verified has been encrypted by using a random number;

first data verifying determination processing for verifying the registration template stored in the storage unit and the first data verifying request to produce a determined result;

first verified result generation processing for producing, as a first verified result, a combination of a message that has been randomly selected and a part or all of the registration template corresponding to the determined result;

decryption processing for decrypting the first verified result to produce a decrypted result;

second data verifying request generation processing for generating a second verifying request based on the decrypted result and the message included in the first verified result;

second data verifying determination processing for generating a second data verifying determination based on the second verifying request and the registration data of the registration template recorded in the storage unit; and second verified result generation processing for producing, as a second verified result, an identifier of the registration data corresponding to the second data verifying determination.

(Supplementary Note 42)

A computer-readable recording medium having recorded thereon an encrypted text verification program for causing a computer to execute:

encryption processing for calculating encrypted data by encrypting input data to be concealed by using a signature key;

registration data generation processing for generating registration data based on the encrypted data and a public key;

processing for storing the registration data as a registration template in a storage unit together with an identifier for uniquely identifying the registration data;

first data verifying request generation processing for generating a first data verifying request in which input data to be verified has been encrypted by using a random number;

first data verifying determination processing for verifying the registration template stored in the storage unit and the first data verifying request to produce a determined result;

first verified result generation processing for producing, as a first verified result, a combination of a message that has been randomly selected and a part or all of the registration template corresponding to the determined result;

decryption processing for decrypting the first verified result to produce a decrypted result;

second data verifying request generation processing for generating a second verifying request based on the decrypted result and the message included in the first verified result;

second data verifying determination processing for generating a second data verifying determination based on the second verifying request and the registration data of the registration template recorded in the storage unit; and second verified result generation processing for producing, as a second verified result, an identifier of the registration data corresponding to the second data verifying determination.

(Supplementary Note 43)

A registration data generation device, including:

a key generation unit configured to generate a secret key and a verification key from a security parameter;

an encryption unit configured to calculate encrypted data by encrypting input data to be concealed by using the secret key; and a registration data generation unit configured to generate registration data based on the encrypted data and the verification key.

(Supplementary Note 44)

A storage device, including:

an identifier management unit configured to manage, based on the registration data generated by the registration data generation device of Supplementary note 43 as input, an identifier for uniquely identifying the registration data; and a storage unit configured to store a registration template including the identifier and the registration data.

(Supplementary Note 45)

A data verifying request device, including:

a data verifying request generation unit configured to generate a data verifying request in which input data to be verified has been encrypted by using a random number;

a verified result reception unit configured to receive a verified result; and a data restoration unit configured to restore data based on the verified result to produce a restored result.

(Supplementary Note 46)

A data verifying device, including:

a registration data reception unit configured to receive the registration template stored in the storage device of Supplementary note 44;

a data verify request reception unit configured to receive the data verifying request from the data matching request device of Supplementary note 45;

a data verifying determination unit configured to verify the registration template and the data matching request to output a determined result; and a verified result generation unit configured to produce a verified result including a part or all of the registration template corresponding to the determined result.

(Supplementary Note 47)
A registration data generation device, including:
a key generation unit configured to generate a signature key and a verification key from a security parameter;
an encryption unit configured to calculate encrypted data by encrypting input data to be concealed by using the signature key; and
a registration data generation unit configured to generate registration data based on the encrypted data and the verification key.

(Supplementary Note 48)
A storage device, including:
an identifier management unit configured to manage, based on the registration data generated by the registration data generation device of Supplementary note 47 as input, an identifier for uniquely identifying the registration data; and
a storage unit configured to store a registration template including the identifier and the registration data.

(Supplementary Note 49)
A data verifying request device, including:
a first data verifying request generation unit configured to generate a first data verifying request in which input data to be verified has been encrypted by using a random number;
a first verified result reception unit configured to receive a first verified result;
a decryption unit configured to decrypt the first verified result to produce a decrypted result; and
a second data verifying request generation unit configured to generate a second data verifying request based on the decrypted result and a message included in the first verified result.

(Supplementary Note 50)
A first data verifying determination device, including:
a registration data reception unit configured to receive the registration template from the storage device of Supplementary note 48;
a first data verifying request reception unit configured to receive the first data verifying request from the data matching request device of Supplementary note 49;
a first data verifying determination unit configured to verify the registration template and the first data matching request to produce a determined result; and
a first verified result generation unit configured to produce, as a first verified result, a combination of a message that has been randomly selected and a part or all of the registration template corresponding to the determined result.

(Supplementary Note 51)
A second data verifying determination device, including:
a registration data reception unit configured to receive the registration template from the storage device of Supplementary note 48;
a second data verifying request reception unit configured to receive the second data verifying request from the data verifying request device of Supplementary note 49;
a second data verifying determination unit configured to generate a second data verifying determination based on the second data verifying request and the registration data of the registration template; and
a second verified result generation unit configured to produce, as a second verified result, an identifier of the registration data corresponding to the second data verifying determination.

(Supplementary Note 52)
A registration data generation device, including:
a key generation unit configured to generate a secret key and a public key from a security parameter;
an encryption unit configured to calculate encrypted data by encrypting input data to be concealed by using the secret key; and
a registration data generation unit configured to generate registration data based on the encrypted data and the verification key.

(Supplementary Note 53)
A storage device, including:
an identifier management unit configured to manage, based on the registration data generated by the registration data generation device of Supplementary note 52 as input, an identifier for uniquely identifying the registration data; and
a storage unit configured to store a registration template including the identifier and the registration data.

(Supplementary Note 54)
A data verifying request device, including:
a first data verifying request generation unit configured to generate a first data verifying request in which input data to be verified has been encrypted by using a random number;
a first verified result reception unit configured to receive a first verified result;
a decryption unit configured to decrypt the first verified result to produce a decrypted result; and
a second data verifying request generation unit configured to generate a second data verifying request based on the decrypted result and a message included in the first verified result.

(Supplementary Note 55)
A first data verifying determination device, including:
a registration data reception unit configured to receive the registration template from the storage device of Supplementary note 53;
a first data verifying request reception unit configured to receive the first data verifying request from the data verifying request device of Supplementary note 54;
a first data verifying determination unit configured to match the registration template and the first data matching request to produce a determined result; and
a first verified result generation unit configured to produce, as a first verified result, a combination of a message that has been randomly selected and a part or all of the registration template corresponding to the determined result.

(Supplementary Note 56)
A second data verifying determination device, including:
a registration data reception unit configured to receive the registration template from the storage device of Supplementary note 53;
a second data verifying request reception unit configured to receive the second data verifying request from the data verifying request device of Supplementary note 54;
a second data verifying determination unit configured to generate a second data verifying determination based on the second data verifying request and the registration data of the registration template; and
a second verified result generation unit configured to produce, as a second matching result, an identifier of the registration data corresponding to the second data verifying determination.

(Supplementary Note 57)

An encrypted text verifying system, including:

a registration data generation device;

a storage device;

a data verifying request device; and a data verifying determination device, the registration data generation device including:
- a key generation unit configured to receive a security parameter as input to output a secret key and a verification key;
- an encryption unit configured to output, based on input data to be concealed having a fixed length and the secret key as input, an encrypted text in which a bitwise exclusive OR between a first encrypted text in which a first plaintext is encrypted by a first key and a second encrypted text in which a second plaintext is encrypted by a second key becomes an encrypted text in which a bitwise exclusive OR between the first plaintext and the second plaintext is encrypted by a bitwise exclusive OR of the first key and the second key; and
- a registration data generation unit configured to output, based on the verification key, the secret key, and the encrypted text as input, registration data, which is data for determining that a Hamming distance between the input data to be concealed corresponding to encrypted data output by the encryption unit and input data to be verified input to the data verifying request device is within a fixed number, the storage device including:
- an identifier management unit configured to manage, based on the registration data output by the registration data generation device as input, an identifier for uniquely identifying the registration data; and
- a storage unit configured to store a registration template including the identifier and the registration data output by the registration data generation device, the data verifying request device including:
- a data verifying request generation unit configured to produce, based on the input data to be verified as input, a data verifying request obtained by subjecting the input data to be verified to concealment processing;
- a verified result reception unit configured to receive a verified result generated by the data verifying determination device in response to the data verifying request; and
- a data restoration unit configured to restore a secret key based on the verified result as input, the data verifying determination device including:
- a registration data reception unit configured to receive the registration template stored in the storage device;
- a data verifying request reception unit configured to receive the data verifying request from the data verifying request device;
- a data verifying determination unit configured to perform, based on the registration template and the data verifying request as input, verifying between verifying data concealed as the data verifying request and the registration data concealed as the encrypted data to produce a determined result; and
- a verified result generation unit configured to produce, based on the determined result and the registration template as input, a verified result including a part or all of the registration template corresponding to the determined result, or a symbol indicating that the registration template corresponding to the determined result does not exist.

(Supplementary Note 58)

An encrypted text verification system according to Supplementary note 57, wherein the encryption unit of the registration data generation device is configured to encode, for the secret key sk and a plaintext Z, the secret key sk by a linear error-correcting code, and to produce as the encrypted text a code word, which is a result of the encoding, and a result obtained by calculating a sum on a vector of the plaintext Z.

(Supplementary Note 59)

An encrypted text verification system according to Supplementary note 57, wherein the encryption unit of the registration data generation device is configured to encode, for the secret key sk and a plaintext Z, a seed used when generating the secret key sk based on a linear error-correcting code, and to output as the encrypted text a code word, which is a result of the encoding, and a result obtained by calculating a sum on a vector of the plaintext Z.

(Supplementary Note 60)

An encrypted text verification system, including:

a registration data generation device;

a storage device;

a first data verifying request device;

a first data verifying determination device;

a second data verifying request device; and a second data verifying determination device, the registration data generation device including:
- a key generation unit configured to receive a security parameter as input, and to produce a verification key for a signature and a signature key;
- an encryption unit configured to produce, based on input data to be concealed having a fixed length and the signature key as input, an encrypted text in which a bitwise exclusive OR between a first encrypted text in which a first plaintext is encrypted by a first key and a second encrypted text in which a second plaintext is encrypted by a second key becomes an encrypted text in which a bitwise exclusive OR between the first plaintext and the second plaintext is encrypted by a bitwise exclusive OR of the first key and the second key; and
- a registration data generation unit configured to produce, based on the verification key, the signature key, and the encrypted text as input, registration data, which is data for determining that a Hamming distance between the input data to be concealed corresponding to encrypted data produced by the encryption unit and input data to be verified input to the first data verifying request device and the second data verifying request device is within a fixed number, the storage device including:
- an identifier management unit configured to manage, based on the registration data produced by the registration data generation device as input, an identifier for uniquely identifying the registration data; and
- a storage unit configured to store a registration template including the identifier and the registration data output by the registration data generation device, the first data verifying request device including a first data verifying request generation unit configured to produce, based on the input data to be verified as input, a first data verifying request obtained by subjecting the input data to be verified to concealment processing, the first data verifying determination device including:
a registration data reception unit configured to receive the registration template stored in the storage device;
a first data verifying request reception unit configured to receive the first data verifying request from the first data verifying request device;
a first data verifying determination unit configured to perform, based on the registration template and the first data verifying request as input, verifying between verifying data concealed as the first data verifying request and the registration data concealed as the encrypted data to produce a determined result; and
a first verified result generation unit configured to produce, based on the determined result and the registration template as input, a first verified result including a message M for uniquely identifying a verifying request, and a part or all of an registration template corresponding to the determined result, or a symbol indicating that the registration template corresponding to the determined result does not exist,
the second data verifying request device including:
a first verified result reception device configured to receive the first verified result from the first data verifying determination device;
a decryption unit configured to decrypt, based on the first verified result and the input data to be verified as input, encrypted data included in the first verified result to produce a decrypted result; and
a second data verifying request generation unit configured to receive the decrypted result and the message M included in the first verified result as input to generate a second verifying request,
the second data verifying determination device including:
a registration data reception unit configured to receive the registration template stored in the storage device;
a second data verifying request reception unit configured to receive the second verifying request from the second data verifying request device;
a second data verifying determination unit configured to generate a second data verifying determination based on the registration template and the second verifying request as input; and
a second verified result generation unit configured to produce a second verified result based on the second data verifying determination and the registration template as input.

(Supplementary Note 61)
The encrypted text verification system according to Supplementary note 60, wherein the encryption unit of the registration data generation device is configured to encode, for the signature key sk and a plaintext Z, the signature key sk by a linear error-correcting code, and to produce as the encrypted text a code word, which is a result of the encoding, and a result obtained by calculating a sum on a vector of the plaintext Z.

(Supplementary Note 62)
The encrypted text verification system according to Supplementary note 60, wherein the encryption unit of the registration data generation device is configured to encode, for the signature key sk and a plaintext Z, a seed used when generating the signature key sk based on a linear error-correcting code, and to produce as the encrypted text a code word, which is a result of the encoding, and a result obtained by calculating a sum on a vector of the plaintext Z.

(Supplementary Note 63)
The encrypted text verification system according to Supplementary note 61 or 62,
wherein the first verified result includes a code word, which is a coded result of the signature key sk, a result obtained by calculating a sum on a vector of the plaintext Z, and the message nonce having a high likelihood of being a value that is different each time, and
wherein the second data verifying request includes a signature for the message nonce generated by using the signature key sk.

(Supplementary Note 64)
The encrypted text verification system according to Supplementary note 61 or 62,
wherein the first verified result includes a code word, which is a coded result of the signature key sk, a result obtained by calculating a sum on a vector of the plaintext Z, and an encrypted text obtained by encrypting the message nonce, which has a high likelihood of being a value that is different each time, by using the verification key vk, and
wherein the second data verifying request includes a result of decrypting the encrypted text by using the signature key sk.

INDUSTRIAL APPLICABILITY

An example of utilization of this invention is protected authorization of biometric information. The input data to be concealed in the data registration phase and the input data to be verified in the encrypted text matching phase is, for example, biometric information acquired from, for example, fingerprints or veins. As a result, whether or not encrypted biometric data stored in the storage device and encrypted biometric data transmitted from the data verifying request device (first data verifying request device) have been collected from the same person can be determined while keeping the biometric data concealed (encrypted) based on whether or not the Hamming distance between the two pieces of input data is a fixed value or less, to thereby perform authorization. The biometric data is not data for which the same data can always be acquired stably, but it can be presumed that data acquired from the same person is similar (i.e., data having a small Hamming distance can be acquired). Therefore, utilization of this invention in biometric authentication is considered to be industrially useful.

REFERENCE SIGNS LIST 100 registration data generation device
101 key generation unit
102 encryption unit
103 registration data generation unit
200 storage device
201 identifier management unit
202 encrypted text storage unit
300 data verifying request device
300A first data verifying request device
301 data verifying request generation unit
301A first data verifying request generation unit
302 verified result reception unit
303 data restoration unit
400 data verifying determination device
400A first data verifying determination device
401 registration data reception unit
401A registration data reception unit
402 data verifying request reception unit 402A first data verifying request reception unit
403 data verifying determination unit
403A first data verifying determination unit
404 verified result generation unit
404A first verified result generation unit
500 second data verifying request device
501 first verifying request generation unit
502 decryption unit
503 second data verifying request generation unit
600 second data verifying determination device
601 registration data reception unit
602 second data verifying request reception unit
603 second data verifying determination unit
604 second verified result generation unit This application is based upon and claims the benefit of priority from Japanese Patent Application No. 2014-225102, filed on Nov. 5, 2014, the disclosure of which is incorporated herein in its entirety by reference.

The invention claimed is:

1. An encrypted text verification system, comprising: a registration data generation device; a storage device; a data verifying request device; and a data verifying determination device,
wherein the registration data generation device includes:
a key generation circuitry configured to generate a secret key and a verification key from a security parameter;
an encryption circuitry configured to calculate encrypted data by encrypting input data to be concealed by using the secret key; and
a registration data generation circuitry configured to generate registration data based on the encrypted data and the verification key;
wherein the storage device is configured to store the registration data generated by the registration data generation device as a registration template in a storage circuitry together with an identifier for uniquely identifying the registration data;
wherein the data verifying request device includes a data verifying request generation circuitry configured to generate a data verifying request in which input data to be verified has been encrypted by using a random number;
wherein the data verifying determination device includes:
a registration data reception circuitry configured to receive the registration template stored in the storage device;
a data verifying request reception circuitry configured to receive the data verifying request from the data verifying request device;
a data verifying determination circuitry configured to verify the registration template stored in the storage circuitry and the data verifying request to produce a determined result; and
a verified result generation circuitry configured to produce a verified result including a part or all of the registration template corresponding to the determined result,
wherein the data verifying request device further includes:
a verified result reception circuitry configured to receive the verified result from the data verifying determining device; and
a data restoration circuitry configured to restore data based on the verified result to produce a restored result.

2. The encrypted text verification system according to claim 1,
wherein the encryption circuitry is configured to calculate the encrypted data by taking an exclusive OR between the input data to be concealed and an error-correcting code generated by performing error-correction coding on the secret key, and
wherein the data verifying request generation circuitry is configured to generate the data verifying request by taking an exclusive OR between the input data to be verified and an error-correcting code obtained by performing error-correction coding on the random number.

3. The encrypted text verification system according to claim 2, wherein the data verifying determination circuitry is configured to produce the determined result by performing error-correction decoding on an exclusive OR between the data verifying request and the encrypted data included in the registration template.

4. The encrypted text verification system according to claim 3, wherein the verified result generation circuitry is configured to produce, as the verified result, a result obtained by adding to the determined result the verification key included in the registration template corresponding to the determined result.

5. The encrypted text verification system according to claim 4, wherein the data restoration circuitry is configured to obtain the restored result by calculating an exclusive OR between the random number and the determined result included in the verified result, and to verify the restored result by using the verification key.

6. The encrypted text verification system according to claim 3, wherein the verified result generation circuitry is configured to produce, as the verified result, the encrypted data included in the registration template corresponding to the determined result.

7. The encrypted text verification system according to claim 6, wherein the data restoration circuitry is configured to obtain the restored result by performing error-correction decoding on an exclusive OR between the verified result and the input data to be verified.

8. An encrypted text verification system, comprising: a registration data generation device; a storage device; a data verifying request device; a first data verifying determination device; and a second data verifying determination device,
wherein the registration data generation device includes:
a key generation circuitry configured to generate a signature key and a verification key from a security parameter;
an encryption circuitry configured to calculate encrypted data by encrypting input data to be concealed by using the signature key; and
a registration data generation circuitry configured to generate registration data based on the encrypted data and the verification key;
wherein the storage device is configured to store the registration data generated by the registration data generation device as a registration template in a storage circuitry together with an identifier for uniquely identifying the registration data;
wherein the data verifying request device includes a first data verifying request generation circuitry configured to generate a first data verifying request in which input data to be verified has been encrypted by using a random number;
wherein the first data verifying determination device includes:
a registration data reception circuitry configured to receive the registration template from the storage device;

a first data verifying request reception circuitry configured to receive the first data verifying request from the data verifying request device;
a first data verifying determination circuitry configured to verify the registration template stored in the storage circuitry and the first data verifying request to produce a determined result;
a first verified result generation circuitry configured to generate, as a first verified result, a combination of a message that has been randomly selected and a part or all of the registration template corresponding to the determined result;
wherein the data verifying request device further includes:
a first verified result reception circuitry configured to receive the first verified result from the first data verifying determination device;
a decryption circuitry configured to decrypt the first verified result to produce a decrypted result; and
a second data verifying request generation circuitry configured to generate a second data verifying request based on the decrypted result and the message included in the first verified result;
wherein the second data verifying determination device includes:
a registration data reception circuitry configured to receive the registration template from the storage device;
a second data verifying request reception circuitry configured to receive the second data verifying request from the data verifying request device;
a second data verifying determination circuitry configured to generate a second data verifying determination based on the second data verifying request and the registration data of the registration template recorded in the storage circuitry; and
a second verified result generation circuitry configured to generate, as a second verified result, an identifier of the registration data corresponding to the second data verifying determination.

9. The encrypted text verification system according to claim 8,
wherein the encryption circuitry is configured to calculate the encrypted data by taking an exclusive OR between the input data to be concealed and an error-correcting code generated by performing error-correction coding on the signature key, and
wherein the first data verifying request generation circuitry is configured to generate the first data verifying request by taking an exclusive OR between the input data to be verified and an error-correcting code obtained by performing error-correction coding on the random number.

10. The encrypted text verification system according to claim 2, wherein the first data verifying determination circuitry is configured to perform error-correction decoding on an exclusive OR between the first data verifying request and the encrypted data included in the registration data of the registration template, and to produce, as the determined result, a set of identifiers corresponding to the encrypted data for which a result is that decryption is not impossible.

11. The encrypted text verification system according to claim 10, wherein the first verified result generation circuitry is configured to produce, as the first verified result, a combination of the message that has been randomly selected and the encrypted data included in the registration data of the registration template corresponding to the determined result.

12. The encrypted text verification system according to claim 11, wherein the decryption circuitry is configured to obtain the decrypted result by performing error-correction decoding on an exclusive OR between the input data to be verified and the encrypted data included in the first verified result.

13. An encrypted text verification system, comprising: a registration data generation device; a storage device; a data verifying request device; a first data verifying determination device; and a second data verifying determination device,
wherein the registration data generation device includes:
a key generation circuitry configured to generate a secret key and a public key from a security parameter;
an encryption circuitry configured to calculate encrypted data by encrypting input data to be concealed by using the secret key; and
a registration data generation circuitry configured to generate registration data based on the encrypted data and the public key;
wherein the storage device is configured to store the registration data generated by the registration data generation device as a registration template in a storage circuitry together with an identifier for uniquely identifying the registration data;
wherein the data verifying request device includes a first data verifying request generation circuitry configured to generate a first data verifying request in which input data to be verified has been encrypted by using a random number;
wherein the first data verifying determination device includes:
a registration data reception circuitry configured to receive the registration template from the storage device;
a first data verifying request reception circuitry configured to receive the first data verifying request from the data verifying request device;
a first data verifying determination circuitry configured to verify the registration template stored in the storage circuitry and the first data verifying request to produce a determined result;
a first verified result generation circuitry configured to generate, as a first verified result, a combination of a message that has been randomly selected and a part or all of the registration template corresponding to the determined result;
wherein the data verifying request device further includes:
a first verified result reception circuitry configured to receive the first verified result from the first data verifying request determination device;
a decryption circuitry configured to decrypt the first verified result to produce a decrypted result; and
a second data verifying request generation circuitry configured to generate a second data verifying request based on the decrypted result and the message included in the first verified result;
wherein second data verifying determination device comprises:
a registration data reception circuitry configured to receive the registration template from the storage device;
a second data verifying request reception circuitry configured to receive the second data verifying request from the data verifying request device;
a second data verifying determination circuitry configured to generate a second data verifying determination based on the second data verifying request and the registration data of the registration template recorded in the storage circuitry; and a second verified result generation circuitry configured to generate, as a second verified result, an identifier of the registration data corresponding to the second data verifying determination.

14. The encrypted text verification system according to claim 13, wherein the encryption circuitry is configured to calculate the encrypted data by taking an exclusive OR between the input data to be concealed and an error-correcting code generated by performing error-correction coding on the secret key, and wherein the first data verifying request generation circuitry is configured to generate the first data verifying request by taking an exclusive OR between the input data to be verified and an error-correcting code obtained by performing error-correction coding on the random number.

15. The encrypted text verification system according to claim 14, wherein the first data verifying determination circuitry is configured to perform error-correction decoding on an exclusive OR between the first data verifying request and the encrypted data included in the registration data of the registration template, and to produce, as the determined result, a set of identifiers corresponding to the encrypted data for which a result is that decryption is not impossible.

16. The encrypted text verification system according to claim 15, wherein the first verified result generation circuitry is configured to produce, as the first verified result, a combination of the message that has been randomly selected and the public key included in the registration data of the registration template corresponding to the determined result.

17. The encrypted text verification system according to claim 16, wherein the decryption circuitry is configured to obtain the decrypted result by performing error-correction decoding on an exclusive OR between the input data to be verified and the public key included in the first verified result.

* * * * *

UNITED STATES PATENT AND TRADEMARK OFFICE
CERTIFICATE OF CORRECTION

PATENT NO. : 10,484,182 B2  
APPLICATION NO. : 15/524151  
DATED : November 19, 2019  
INVENTOR(S) : Toshiyuki Isshiki et al.

Page 1 of 2

It is certified that error appears in the above-identified patent and that said Letters Patent is hereby corrected as shown below:

In the Specification

Column 4, Line 16; Delete "result:" and insert --result;-- therefor

Column 4, Line 22; Delete "key:" and insert --key;-- therefor

Column 4, Line 34; Delete "result:" and insert --result;-- therefor

Column 4, Line 54; Delete "key:" and insert --key;-- therefor

Column 4, Line 56; Delete "key:" and insert --key;-- therefor

Column 4, Line 59; Delete "data:" and insert --data;-- therefor

Column 5, Line 7; Delete "result:" and insert --result;-- therefor

Column 5, Line 11; Delete "unit:" and insert --unit;-- therefor

Column 7, Line 31; Delete "signature a" and insert --signature σ-- therefor

Column 16, Line 16; Delete "Q[O]" and insert --Q[0]-- therefor

Column 17, Line 41; Delete "a," and insert --σ,-- therefor

Column 19, Line 18; After "i=1", insert --,--

Column 20, Line 2; Delete "ID_)," and insert --ID_1),-- therefor

Column 22, Line 16; After "sk(+)R", insert --.--

Signed and Sealed this  
Twenty-fourth Day of November, 2020

Andrei Iancu  
*Director of the United States Patent and Trademark Office*

CERTIFICATE OF CORRECTION (continued)
U.S. Pat. No. 10,484,182 B2

In the Claims

Column 43, Line 55; In Claim 10, delete "claim 2," and insert --claim 8,-- therefor